(12) United States Patent
Ouchi et al.

(10) Patent No.: US 11,309,989 B2
(45) Date of Patent: Apr. 19, 2022

(54) TERMINAL APPARATUS AND METHOD

(71) Applicants: Sharp Kabushiki Kaisha, Sakai (JP); FG Innovation Company Limited, New Territories (HK)

(72) Inventors: Wataru Ouchi, Sakai (JP); Shoichi Suzuki, Sakai (JP); Tomoki Yoshimura, Sakai (JP); Liqing Liu, Sakai (JP); Taewoo Lee, Sakai (JP); Daiichiro Nakashima, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 199 days.

(21) Appl. No.: 16/629,594

(22) PCT Filed: Aug. 9, 2018

(86) PCT No.: PCT/JP2018/029908
§ 371 (c)(1),
(2) Date: Jan. 9, 2020

(87) PCT Pub. No.: WO2019/031580
PCT Pub. Date: Feb. 14, 2019

(65) Prior Publication Data
US 2021/0351865 A1 Nov. 11, 2021

(30) Foreign Application Priority Data

Aug. 9, 2017 (JP) .............................. JP2017-154083

(51) Int. Cl.
*H04L 1/00* (2006.01)
*H04W 8/24* (2009.01)
(Continued)

(52) U.S. Cl.
CPC ............. *H04L 1/0038* (2013.01); *H04W 8/24* (2013.01); *H04W 24/08* (2013.01);
(Continued)

(58) Field of Classification Search
CPC ... H04L 1/0038; H04L 5/0082; H04L 1/0052; H04W 72/042; H04W 8/24; H04W 24/08;
(Continued)

(56) References Cited

U.S. PATENT DOCUMENTS

| 2018/0020443 | A1* | 1/2018 | Lee ........................ H04W 48/12 |
| 2020/0204294 | A1* | 6/2020 | Ma ........................ H04W 72/042 |
| 2020/0213837 | A1* | 7/2020 | Pan ................... H04W 72/0446 |

OTHER PUBLICATIONS

Official Communication issued in International Patent Application No. PCT/JP2018/029908, dated Oct. 16, 2018.
(Continued)

*Primary Examiner* — Dady Chery
(74) *Attorney, Agent, or Firm* — ScienBiziP, P.C.

(57) ABSTRACT

A terminal apparatus includes a transmitter configured to transmit capability information of the terminal apparatus, and a receiver configured to perform blind detection of a PDCCH from a search space in a control resource set, wherein in a case that a capability of blind detection is supported, the blind detection detecting the PDCCH from search spaces in control resource sets the number of which is greater than a prescribed number in a prescribed duration, the transmitter transmits, as the capability information of the terminal apparatus, at least two of pieces of information including (a) a maximum number of blind detections that can be performed in the prescribed duration, (b) a maximum number of blind detections in a unit time, (c) a maximum number of blind detections based on configuration for the control resource set, and (d) a maximum number of the control resource sets for which blind detections can be simultaneously performed.

2 Claims, 16 Drawing Sheets

(51) Int. Cl.
 *H04W 24/08* (2009.01)
 *H04W 72/04* (2009.01)
(52) U.S. Cl.
 CPC ..... *H04W 72/042* (2013.01); *H04W 72/0446* (2013.01); *H04W 72/0453* (2013.01)
(58) Field of Classification Search
 CPC ......... H04W 72/0446; H04W 72/0453; H04W 72/048; H04W 24/10
 See application file for complete search history.

(56) References Cited

OTHER PUBLICATIONS

NTT DOCOMO, "New SID Proposal: Study on New Radio Access Technology", 3GPP TSG RAN Meeting #71, RP-160671, Mar. 7-10, 2016, 8 pages.
ZTE, "NR PDCCH Coreset Configuration", 3GPP TSG RAN WG1 Meeting #AH_NR2, R1-1710106, Jun. 26-30, 2017, pp. 1-5.
Vivo et al., "WF on NR PDDCH Blind decodes", 3GPP TSG RAN WG1 NR Ad-Hoc#2, R1-1711754, Jun. 27-30, 2017, 2 pages.

* cited by examiner

(a) Number of PDCCH candidates corresponding to PDCCH start symbol

| Search space | | | Number of PDCCH candidates from first OFDM symbol | Number of PDCCH candidates from second OFDM symbol | Number of PDCCH candidates from third OFDM symbol | Number of PDCCH candidates from fourth OFDM symbol |
|---|---|---|---|---|---|---|
| Type | Aggregation level | Size [in CCEs] | | | | |
| UE-specific | 1 | 6 | 6 | 6*a1 | 6*a3 | 6*a5 |
| | 2 | 12 | 6 | 6*a1 | 6*a3 | 6*a5 |
| | 4 | 8 | 2 | 2*a1 | 2*a3 | 2*a5 |
| | 8 | 16 | 2 | 2*a1 | 2*a3 | 2*a5 |
| Common | 4 | 16 | 4 | 4*a2 | 4*a4 | 4*a6 |
| | 8 | 16 | 2 | 2*a2 | 2*a4 | 2*a6 |

(b) Number of PDCCH candidates corresponding to mini-slot

| Search space | | | Number of PDCCH candidates in first mini-slot | Number of PDCCH candidates in second mini-slot | Number of PDCCH candidates in third mini-slot | Number of PDCCH candidates in fourth mini-slot |
|---|---|---|---|---|---|---|
| Type | Aggregation level | Size [in CCEs] | | | | |
| UE-specific | 1 | 6 | 6 | 6*b1 | 6*b3 | 6*b5 |
| | 2 | 12 | 6 | 6*b1 | 6*b3 | 6*b5 |
| | 4 | 8 | 2 | 2*b1 | 2*b3 | 2*b5 |
| | 8 | 16 | 2 | 2*b1 | 2*b3 | 2*b5 |
| Common | 4 | 16 | 4 | 4*b2 | 4*b4 | 4*b6 |
| | 8 | 16 | 2 | 2*b2 | 2*b4 | 2*b6 | a1~a6, b1~b6: Scaling factor for PDCCH candidates reduction

FIG. 14

TERMINAL APPARATUS AND METHOD

TECHNICAL FIELD

The present invention relates to a terminal apparatus and a method.

This application claims priority to JP 2017-154083 filed on Aug. 9, 2017, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as User Equipment (UE). LTE is a cellular communication system in which multiple areas are deployed in a cellular structure, with each of the multiple areas being covered by a base station apparatus. A single base station apparatus may manage multiple cells.

In the 3GPP, for proposal to International Mobile Telecommunication (IMT)-2020, which is a standard for next-generation mobile communication system developed by the International Telecommunications Union (ITU), a next-generation standard (New Radio (NR)) has been studied (NPL 1). The NR has been requested to meet requirements assuming three scenarios: enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology," RP-160671, NTT docomo, 3GPP TSG RAN Meeting #71, Goteborg, Sweden, 7-10 Mar. 2016.

SUMMARY OF INVENTION

Technical Problem

One aspect of the present invention is to provide a terminal apparatus and a method capable of efficient communication.

Solution to Problem (1) A first aspect of the present invention is a terminal apparatus including a transmitter configured to transmit capability information of the terminal apparatus, and a receiver configured to perform blind detection of a PDCCH from a search space in a control resource set, wherein in a case that a capability of blind detection is supported, the blind detection detecting the PDCCH from search spaces in control resource sets the number of which is greater than a prescribed number in a prescribed duration, the transmitter transmits, as the capability information of the terminal apparatus, at least two of pieces of information including (a) a maximum number of blind detections that can be performed in the prescribed duration, (b) a maximum number of blind detections in a unit time, (c) a maximum number of blind detections based on configuration for the control resource set, and (d) a maximum number of the control resource sets for which blind detections can be simultaneously performed.

(2) A second aspect of the present invention is a method comprising the steps of transmitting capability information of a terminal apparatus, performing blind detection of a PDCCH from a search space in a control resource set, and in a case that a capability of blind detection is supported, the blind detection detecting the PDCCH from search spaces in control resource sets the number of which is greater than a prescribed number in a prescribed duration, transmitting, as the capability information of the terminal apparatus, at least two of pieces of information including (a) a maximum number of blind detections that can be performed in the prescribed duration, (b) a maximum number of blind detections in a unit time, (c) a maximum number of blind detections based on configuration for the control resource set, and (d) a maximum number of the control resource sets for which blind detections can be simultaneously performed.

Advantageous Effects of Invention

According to an aspect of the present invention, the terminal apparatus and/or the base station apparatus can communicate efficiently.

BRIEF DESCRIPTION OF DRAWINGS

FIG. 14 is a diagram illustrating an example of a PDCCH candidate monitored by the terminal apparatus 1 according to the one aspect of the present embodiment.

DESCRIPTION OF EMBODIMENTS

Embodiments of the present invention will be described below.

Figure 1:
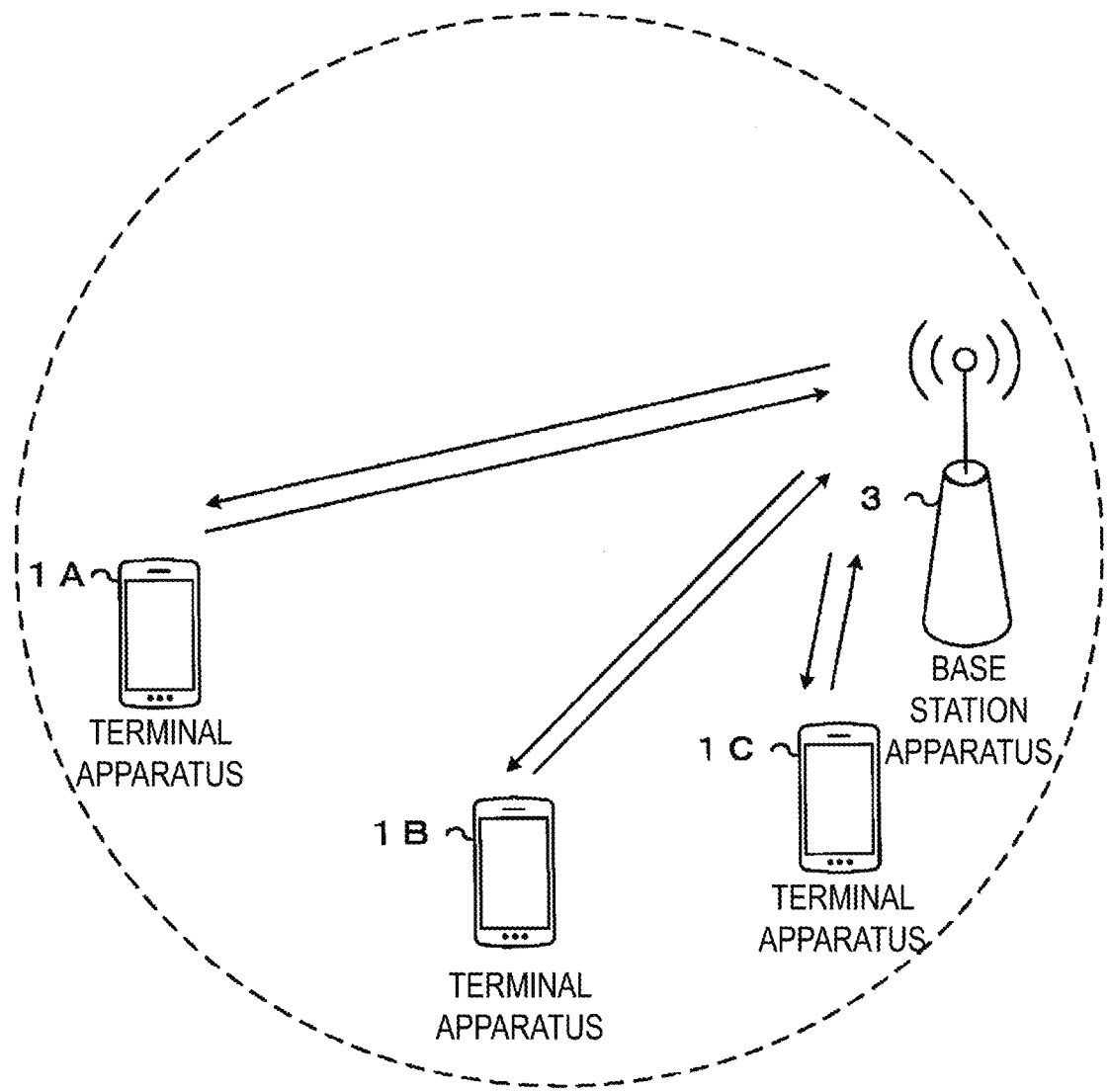
FIG. 1 is a conceptual diagram of a radio communication system according to one aspect of the present embodiment.

FIG. 1 is a conceptual diagram of a radio communication system according to one aspect of the present embodiment. In FIG. 1, a radio communication system includes terminal apparatuses 1A to 1C and a base station apparatus 3. Hereinafter, the terminal apparatuses 1A to 1C are also referred to as a terminal apparatus 1.

Hereinafter, various radio parameters related to communications between the terminal apparatus 1 and the base station apparatus 3 will be described. Here, at least some of the radio parameters (for example, Subcarrier Spacing (SCS)) are also referred to as Numerology. The radio parameters include at least some of the subcarrier spacing, a length of an OFDM symbol, a length of a subframe, a length of a slot, or a length of a mini-slot.

The subcarrier spacing may be classified into two: reference subcarrier spacing (Reference SCS, Reference Numerology) and subcarrier spacing (Actual SCS, Actual Numerology) for a communication method used for the actual wireless communications. The reference subcarrier spacing may be used to determine at least some of the radio parameters. For example, the reference subcarrier spacing is used to configure the length of the subframe. Here, the reference subcarrier spacing is, for example, 15 kHz.

The subcarrier spacing used for the actual wireless communications is one of the radio parameters for the communication method (for example, Orthogonal Frequency Division Multiplex (OFDM), Orthogonal Frequency Division Multiple Access (OFDMA), Single Carrier-Frequency Division Multiple Access (SC-FDMA), Discrete Fourier Transform-spread-OFDM (DFT-s-OFDM) used for no communication between the terminal apparatus 1 and the base station apparatus 3. Hereinafter, the reference subcarrier spacing is also referred to as first subcarrier spacing. The subcarrier spacing used for the actual wireless communications is also referred to as second subcarrier spacing.

Figure 2:
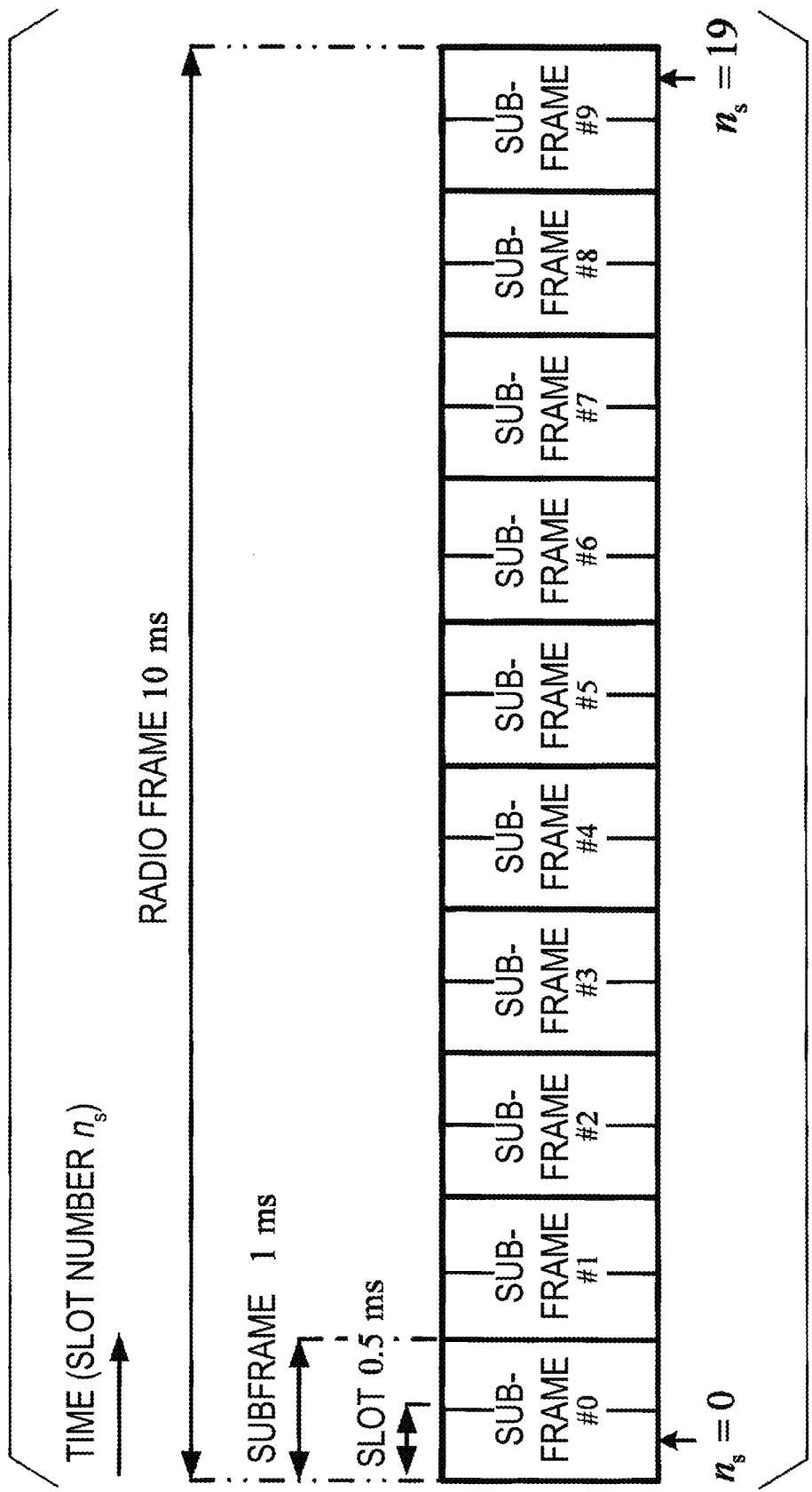
FIG. 2 is an example illustrating configurations of a radio frame, subframes, and slots according to the one aspect of the present embodiment.

FIG. 2 is an example illustrating configurations of a radio frame, subframes, and slots according to the one aspect of the present embodiment. In one example illustrated in FIG. 2, the length of the slot is 0.5 ms, the length of the subframe is 1 ms, and the length of the radio frame is 10 ms. The slot may be a unit for resource allocation in the time domain. For example, the slot may be a unit for mapping of one transport block. For example, the transport block may be mapped to one slot. Here, the transport block may be a unit of data to be transmitted in a prescribed interval (for example, Transmission Time Interval (TTI)) defined in a higher layer (for example, Medium Access Control (MAC)).

For example, the length of the slot may be given according to the number of OFDM symbols. For example, the number of OFDM symbols may be 7 or 14. The length of the slot may be given based on at least the length of the OFDM symbol. The length of the OFDM symbol may differ based on at least the second subcarrier spacing. The length of the OFDM symbol may be given based on at least the number of points of Fast Fourier Transform (FFT) used to generate the OFDM symbol. The length of the OFDM symbol may include a length of a Cyclic Prefix (CP) added to the OFDM symbol. Here, the OFDM symbol may be referred to as a symbol. In a case that a communication method other than OFDM is used in communications between the terminal apparatus 1 and the base station apparatus 3 (for example, in the use of SC-FDMA, DFT-s-OFDM, or the like), the generated SC-FDMA symbol and/or DFT-s-OFDM symbol is also referred to as an OFDM symbol. Here, for example, the length of the slot may be 0.25 ms, 0.5 ms, 1 ms, 2 ms, or 3 ms. Moreover, unless otherwise stated, OFDM includes SC-FDMA or DFT-s-OFDM.

The OFDM includes a multi-carrier communication method applying waveform shaping (Pulse Shape), PAPR reduction, out-of-band radiation reduction, or filtering, and/or phase processing (for example, phase rotation and the like). The multi-carrier communication method may be a communication method that generates/transmits a signal in which multiple subcarriers are multiplexed.

The length of the subframe may be 1 ms. The length of the subframe may be given based on the first subcarrier spacing. For example, with the first subcarrier spacing of 15 kHz, the length of the subframe may be 1 ms. The subframe may include one or more slots.

The radio frame may be given according to the number of subframes. The number of subframes for the radio frame may be, for example, 10.

Figure 3:
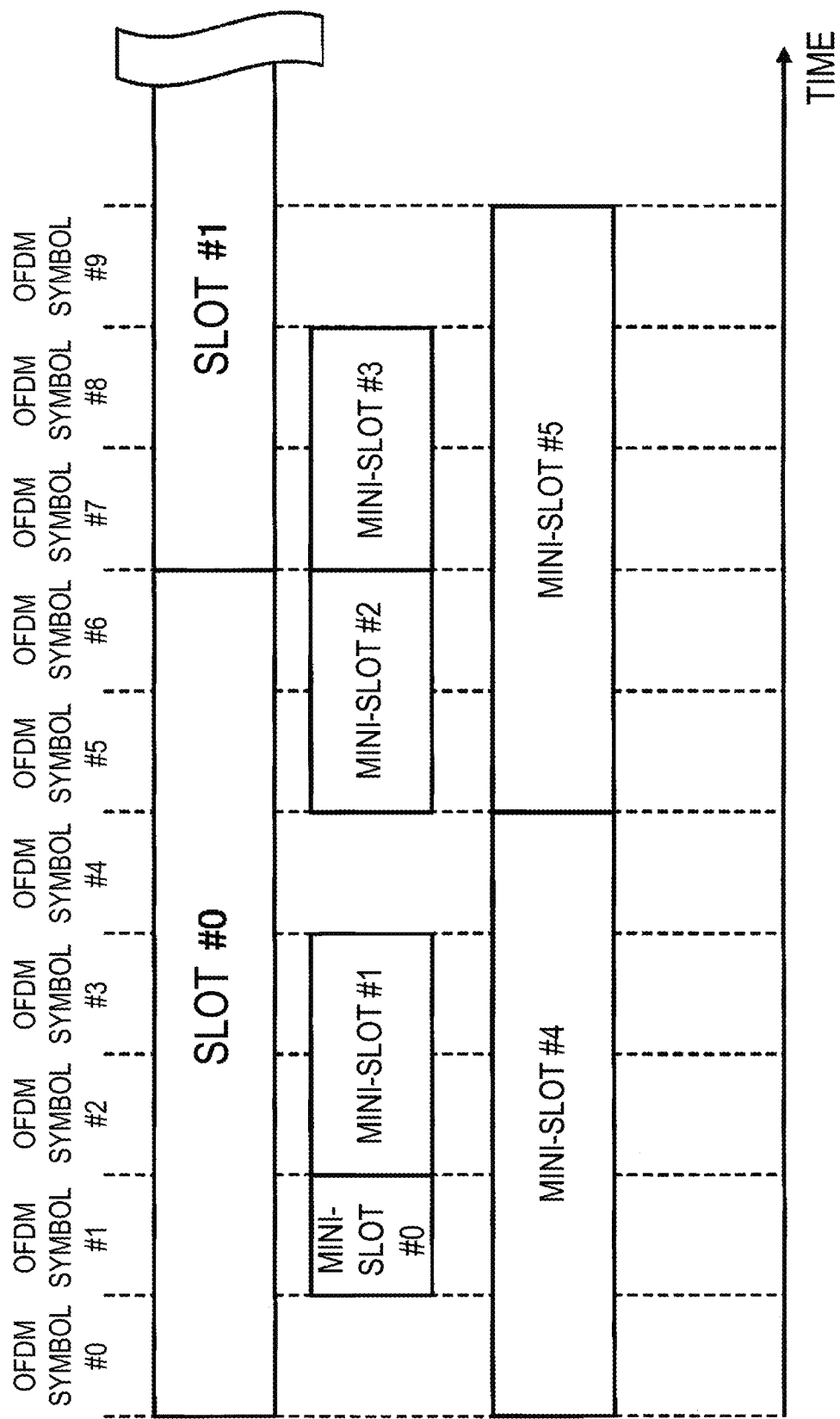
FIG. 3 is a diagram illustrating a configuration example of the slots and mini-slots according to the one aspect of the present embodiment.

FIG. 3 is a diagram illustrating a configuration example of the slots and mini-slots according to the one aspect of the present embodiment. In FIG. 3, the number of OFDM symbols constituting the slot is seven. A mini-slot may include a smaller number of OFDM symbols than the number of OFDM symbols constituting a slot. The length of the mini-slot may be shorter than that of the slot. FIG. 3 illustrates a mini-slot #0 to a mini-slot #5 as an example of the configuration of the mini-slots. The mini-slot may include a single OFDM symbol, as indicated by the mini-slot #0. The mini-slot may include two OFDM symbols as indicated by the mini-slots #1 to #3. Moreover, a gap may be inserted between two mini-slots, as indicated by the mini-slots #1 and #2. Moreover, the mini-slot may be configured so as to cross the boundary between the slots #0 and #1, as indicated by the mini-slot #5. In other words, the mini-slot may be configured so as to cross the boundary between the slots. Here, the mini-slot is also referred to as a sub-slot. The mini-slot is also referred to as short Transmission Time Interval (short TTI (sTTI)). Moreover, in the following, the slot may be replaced by the mini-slot. The mini-slot may include the same number of OFDM symbols as that of the slot. A mini-slot may include a larger number of OFDMs than the number of OFDM symbols constituting the slot. The number of OFDM symbols constituting the mini-slot may be smaller than the number of OFDM symbols constituting one slot. A duration of a mini-slot may be shorter than a duration of one slot. A length of the time domain of the mini-slot may be shorter than that of the slot. The length of the time domain of the mini-slot may be shorter than that of a subframe.

Physical channels and physical signals according to various aspects of the present embodiment will be described.

In FIG. 1, the following uplink physical channels are at least used for uplink radio communication from the terminal apparatus 1 to the base station apparatus 3. The uplink physical channels are used by a physical layer for transmission of information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes Channel State Information (CSI) of a downlink channel, a Scheduling Request (SR) used to request a PUSCH (UL-SCH: Uplink-Shared Channel) resource for an initial transmission, and a Hybrid Automatic Repeat request ACKnowledgement (HARQ-ACK) for downlink data (Transport block (TB), a Medium Access Control Protocol Data Unit (MAC PDU), Downlink-Shared Channel (DL-SCH), and a Physical Downlink Shared Channel (PDSCH)). The HARQ-ACK indicates an acknowledgement (ACK) or a negative-acknowledgement (NACK). The HARQ-ACK is also referred to as HARQ feedback, HARQ information, HARQ control information, and ACK/NACK.

The Channel State Information (CSI) includes at least a Channel Quality Indicator (CQI) and a Rank Indicator (RI). The channel quality indicator may include a Precoder Matrix Indicator (PMI). The CQI is an indicator associated with channel quality (propagation strength), and the PMI is an indicator for indicating a precoder. The RI is an indicator for indicating a transmission rank (or the number of transmission layers).

The PUSCH is used to transmit uplink data (TB, MAC PDU, UL-SCH, PUSCH). The PUSCH may be used to transmit HARQ-ACK and/or channel state information together with the uplink data. Furthermore, the PUSCH may be used to transmit only the channel state information or to transmit only the HARQ-ACK and the channel state information. The PUSCH is used to transmit a random access message 3.

The PRACH is used to transmit a random access preamble (random access message 1). The PRACH is used for indicating initial connection establishment procedure, handover procedure, connection re-establishment procedure, synchronization (timing adjustment) for uplink data transmission, and a request for a PUSCH (UL-SCH) resource. The random access preamble may be used to notify the base station apparatus 3 of an index (random access preamble index) given by the higher layer of the terminal apparatus 1.

The random access preamble may be provided by cyclic-shifting of a Zadoff-Chu sequence corresponding to a physical root sequence index u. The Zadoff-Chu sequence may be generated based on the physical root sequence index u. In a single cell, multiple random access preambles may be defined. The random access preamble may be identified based on at least the index of the random access preamble. Different random access preambles corresponding to different indices of random access preambles may correspond to different combinations of the physical root sequence index u and the cyclic shift. The physical root sequence index u and the cyclic shift may be provided based on at least information included in the system information. The physical root sequence index u may be an index for identifying a sequence included in the random access preamble. The random access preamble may be identified based on at least the physical root sequence index u.

In FIG. 1, the following uplink physical signal is used for the uplink radio communication. The uplink physical signal need not be used for transmitting information output from the higher layer, but is used by the physical layer.

Uplink Reference Signal (UL RS)

According to the present embodiment, at least the following two types of uplink reference signals may be used.

Demodulation Reference Signal (DMRS)
Sounding reference signal (SRS)

The DMRS is associated with transmission of the PUSCH and/or the PUCCH. The DMRS is multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS need not be associated with transmission of the PUSCH or the PUCCH. The base station apparatus 3 may use the SRS to measure the channel state. The SRS may be transmitted at the end of the subframe in an uplink slot or in a prescribed number of OFDM symbols from the end.

In FIG. 1, the following downlink physical channels are used for downlink radio communication from the base station apparatus 3 to the terminal apparatus 1. The downlink physical channels are used by the physical layer for transmission of information output from the higher layer.

Physical Broadcast Channel (PBCH)
Physical Downlink Control Channel (PDCCH)
Physical Downlink Shared Channel (PDSCH)

The PBCH is used for broadcasting a Master Information Block (MIB, a Broadcast Channel (BCH)) that is commonly used by the terminal apparatuses 1. The PBCH may be transmitted based on a prescribed transmission interval. For example, the PBCH may be transmitted at an interval of 80 ms. Contents of information included in the PBCH may be updated at every 80 ms. The PBCH may include 288 subcarriers. The PBCH may include 2, 3, or 4 OFDM symbols. The MIB may include information relating to an identifier (index) of a synchronization signal. The MIB may include information for indicating at least a part of: the number of the slot in which PBCH is transmitted, the number of the subframe in which PBCH is transmitted, and the number of the radio frame in which PBCH is transmitted.

The PDCCH is used to transmit Downlink Control Information (DCI). The downlink control information is also referred to as a DCI format. The downlink control information may include at least either a downlink grant or an uplink grant. The downlink grant is also referred to as a downlink assignment or a downlink allocation.

A single downlink grant is used for at least scheduling of a single PDSCH in a single serving cell. The downlink grant is used at least for the scheduling of the PDSCH in the same slot as the slot in which the downlink grant is transmitted.

A single uplink grant is used at least for scheduling of a single PUSCH in a single serving cell.

In the terminal apparatus 1, one or more control resource sets are configured for searching for PDCCH. The terminal apparatus 1 attempts to receive the PDCCH in the configured control resource set. Details of the control resource set will be described later.

The PDSCH is used to transmit downlink data (DL-SCH, PDSCH). The PDSCH is at least used to transmit a random access message 2 (random access response). The PDSCH is at least used to transmit the system information including parameters used for initial access.

In FIG. 1, the following downlink physical signals are used for the downlink radio communication. The downlink physical signal need not be used for transmitting the information output from the higher layer, but is used by the physical layer.

Synchronization signal (SS)

Downlink Reference Signal (DL RS)

The synchronization signal is used for the terminal apparatus 1 to establish synchronization in a frequency domain and a time domain in the downlink. The synchronization signal includes a Primary Synchronization Signal (PSS) and a Second Synchronization Signal (SSS).

The downlink reference signal is used for the terminal apparatus 1 to perform channel compensation on a downlink physical channel. The downlink reference signal is used for the terminal apparatus 1 to obtain the downlink channel state information.

According to the present embodiment, the following two types of downlink reference signals are used.

Demodulation Reference Signal (DMRS)

Shared Reference Signal (Shared RS)

The DMRS is associated with transmission of the PDCCH and/or the PDSCH. The DMRS is multiplexed with the PDCCH or the PDSCH. In order to perform channel compensation of the PDCCH or the PDSCH, the terminal apparatus 1 may use the DMRS corresponding to the PDCCH or the PDSCH. Hereinafter, the transmission of the PDCCH and the DMRS corresponding to the PDCCH together is simply referred to as transmission of the PDCCH. Hereinafter, the transmission of the PDSCH and the DMRS corresponding to the PDSCH together is simply referred to as transmission of the PDSCH.

The Shared RS may be associated with transmission of at least PDCCH. The Shared RS may be multiplexed with the PDCCH. The terminal apparatus 1 may use the Shared RS to perform channel compensation of the PDCCH. Hereinafter, the transmission of the PDCCH and the Shared RS together is also simply referred to as transmission of the PDCCH.

The DMRS may be an RS which is individually configured for the terminal apparatus 1. The sequence of DMRS may be provided based on at least parameters individually configured for the terminal apparatus 1. The DMRS may be individually transmitted for the PDCCH and/or the PDSCH. On the other hand, the Shared RS may be an RS which is commonly configured for multiple terminal apparatuses 1. The sequence of Shared RS may be provided regardless of parameters individually configured for the terminal apparatus 1. For example, the Shared RS sequence may be given based on at least some of the slot number, the mini-slot number, or a cell ID (identity, identifier). The Shared RS may be RS transmitted regardless of whether the PDCCH and/or the PDSCH is transmitted.

The downlink physical channel and the downlink physical signal are also referred to as a downlink signal. The uplink physical channel and the uplink physical signal are also referred to as an uplink signal. The downlink physical channels and the uplink physical channels are collectively referred to as a physical channel. The downlink physical signals and the uplink physical signals are collectively referred to as a physical signal.

The BCH, the UL-SCH, and the DL-SCH are transport channels. The channel used in the Medium Access Control (MAC) layer is referred to as a transport channel. The unit of transport channels used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in a Radio Resource Control (RRC) layer. Furthermore, the base station apparatus 3 and the terminal apparatus 1 may transmit and/or receive a MAC Control Element (CE) in the MAC layer. Here, the RRC signaling and/or the MAC CE is also referred to as higher layer signaling.

The PUSCH and the PDSCH are at least used to transmit the RRC signaling and the MAC CE. Here, the RRC signaling transmitted from the base station apparatus 3 through the PDSCH may be signaling common to the multiple terminal apparatuses 1 in a cell. The signaling common to the multiple terminal apparatuses 1 in the cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1. The PDSCH including the dedicated RRC signaling may be scheduled via the PDCCH in the first control resource set.

Broadcast Control CHannel (BCCH), Common Control CHannel (CCCH), and Dedicated Control CHannel (DCCH) are logical channels. For example, the BCCH is a higher-layer channel used to transmit the MIB. Moreover, the Common Control Channel (CCCH) is a higher-layer channel used to transmit information common to the multiple terminal apparatuses 1. Here, the CCCH is used for the terminal apparatus 1 which is not in an RRC-connected state, for example. Moreover, the Dedicated Control Channel (DCCH) is a higher-layer channel used to transmit individual control information (dedicated control information) to the terminal apparatus 1. Here, DCCH is used for the terminal apparatus 1 which is in an RRC-connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

Hereinafter, the control resource set will be described.

Figure 4:
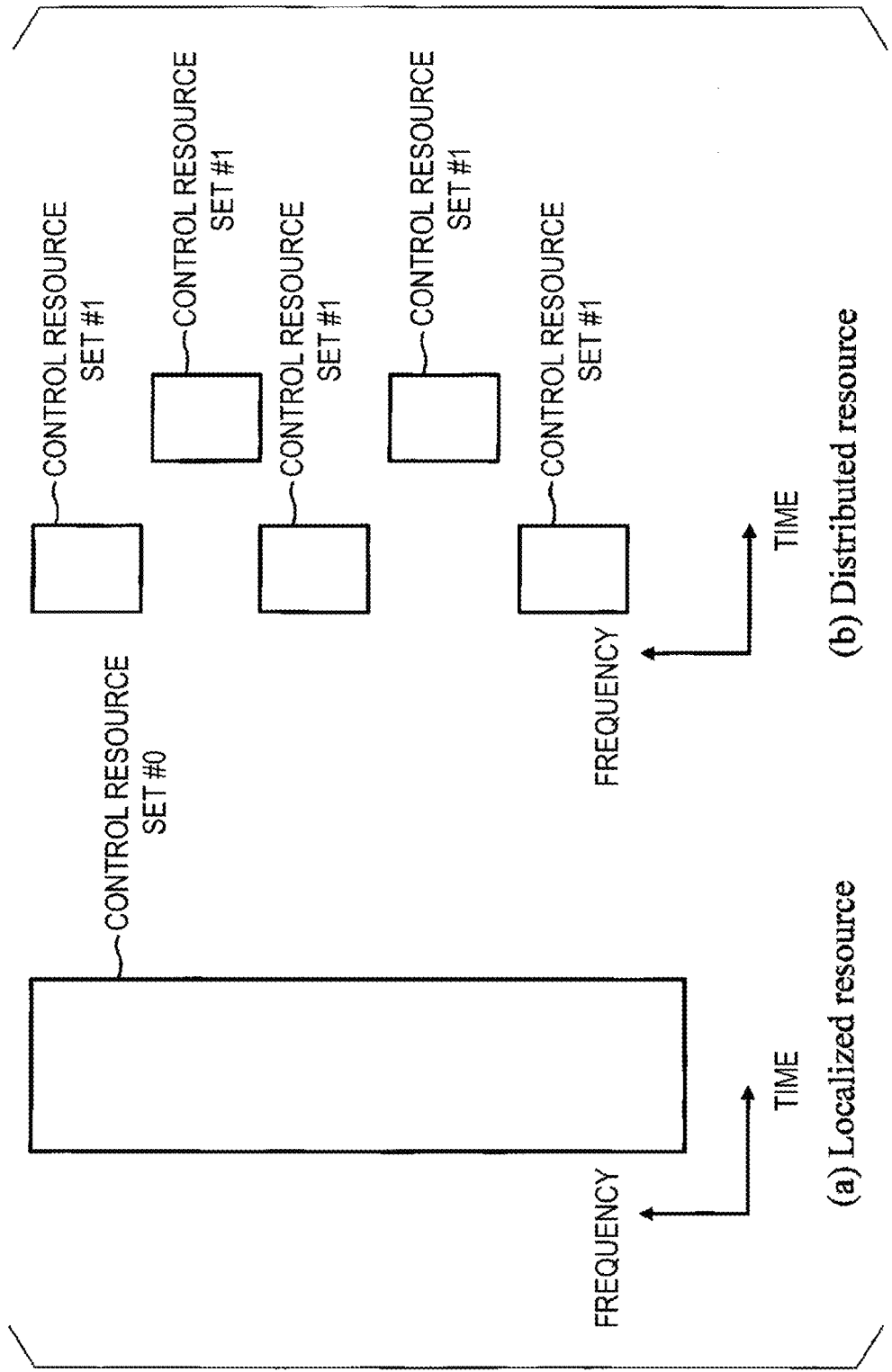
FIG. 4 is a diagram illustrating an example of mapping control resource sets according to the one aspect of the present embodiment.

FIG. 4 is a diagram illustrating an example of mapping control resource sets according to the one aspect of the present embodiment. The control resource set may indicate a time frequency domain in which one or more control channels can be mapped. The control resource set may be a region in which the terminal apparatus 1 attempts to receive and/or detect (blind detect (BD)) the PDCCH. As illustrated in FIG. 4(a), the control resource set may include a continuous resource (Localized resource). As illustrated in FIG. 4(b), the control resource set may include non-continuous resources (distributed resources).

In the frequency domain, the unit of mapping the control resource sets may be a resource block. In the time domain, the unit of mapping the control resource sets may be the OFDM symbol.

The frequency domain of the control resource set may be identical to the system bandwidth of the serving cell. The frequency domain of the control resource set may be provided based on at least the system bandwidth of the serving cell. The frequency domain of the control resource set may be provided based on at least higher-layer signaling and/or downlink control information.

The time domain of the control resource set may be provided based on at least higher-layer signaling and/or downlink control information.

The control resource set may include at least one or both of a Common control resource set and a Dedicated control resource set. The common control resource set may be a control resource set configured commonly to the multiple terminal apparatuses 1. The common control resource set may be provided based on at least the MIB, first system information, second system information, the common RRC signaling, the cell ID, or the like. The dedicated control resource set may be a control resource set configured to be dedicatedly used for the terminal apparatus 1. The dedicated control resource set may be provided based on at least dedicated RRC signaling and/or a value of C-RNTI.

The control resource set may be a set of control channels (or control channel candidates) to be monitored by the terminal apparatus 1. The control resource set may include a set of control channels (or control channel candidates) to be monitored by the terminal apparatus 1. The control resource set may be configured to include one or more Search Spaces (SS). The control resource set may be synonymous with the search space.

The search space includes one or more PDCCH candidates. The terminal apparatus 1 receives a PDCCH candidate included in the search space and attempts to receive the PDCCH. Here, the PDCCH candidate is also referred to as a blind detection candidate.

The search space may include at least one or both of Common Search Space (CSS) and UE-specific Search Space (USS). The CSS may be a search space configured commonly to multiple terminal apparatuses 1. The USS may be a search space including a configuration to be dedicatedly used for the terminal apparatus 1. The CSS may be provided based on at least the MIB, the first system information, the second system information, the common RRC signaling, the cell ID, or the like. The USS may be provided based on at least the dedicated RRC signaling and/or the value of C-RNTI.

The CSS may include a type 0 PDCCH CSS for the DCI format scrambled with the SI-RNTI used to transmit the system information in the primary cell and a type 1 PDCCH CSS for the DCI format scrambled with the INT-RNTI used for initial access. The terminal apparatus 1 can monitor the PDCCH candidates in those search spaces. The DCI format scrambled with a prescribed RNTI may be a DCI format to which a Cyclic Redundancy Check (CRC) scrambled with a prescribed RNTI is added.

Note that PDCCH and/or DCI included in the CSS need not include a Carrier Indicator Field (CIF) indicating which serving cell (or which component carrier) the PDCCH and/or DCI schedules the PDSCH or PUSCH for.

Note that in a case that a carrier aggregation is configured in which multiple serving cells and/or multiple component carriers are aggregated for the terminal apparatus 1 to perform communication (transmission and/or reception), the PDCCH and/or DCI included in the USS for a prescribed serving cell (prescribed component carrier) may include a CIF indicating which serving cell and/or which component carrier the PDCCH and/or DCI schedules the PDSCH or PUSCH for.

Note that in a case that one serving cell and/or one component carrier are used for the terminal apparatus 1 to perform communication, the PDCCH and/or DCI included in the USS may not include the CIF indicating which serving cell and/or which component carrier the PDCCH and/or DCI schedules the PDSCH or PUSCH for.

The common control resource set may include at least one or both of the CSS and the USS. The dedicated control resource set may include at least one or both of the CSS and the USS. The dedicated control resource set need not include the CSS.

A physical resource of the search space includes a Control Channel Element (CCE) of the control channel. The CCE includes a prescribed number of Resource Element Groups (REGs). For example, the CCE may include six REGs. The REG may include one OFDM symbol in one Physical Resource Block (PRB). In other words, the REG may include 12 Resource Elements (REs). The PRB is also simply referred to as a Resource Block (RB).

Specifically, the terminal apparatus 1 can detect the PDCCH and/or DCI for the terminal apparatus 1 by blind detecting the PDCCH candidates included in the search space in the control resource set.

The number of blind detections for one control resource set in one serving cell and/or one component carrier may be determined based on the type of search space for the PDCCH included in the control resource set, the type of the aggregation level, and the number of PDCCH candidates. Here, the type of the terminal space may include at least one of the CSS and/or the USS and/or a UGSS (UE Group SS) and/or a GCSS (Group CSS). The type of the aggregation level indicates a maximum aggregation level supported for the CCE constituting the search space, and may be defined/configured from at least one of $\{1, 2, 4, 8, \ldots, X\}$ (where X is a prescribed value). The number of PDCCH candidates may indicate the number of PDCCH candidates for a certain aggregation level. In other words, the number of PDCCH candidates may be defined/configured for each of the multiple aggregation levels. The UGSS may be a search space assigned commonly to one or multiple terminal apparatuses 1. The GCSS may be a search space to which the DCI including parameters associated with the CSS is mapped to one or multiple terminal apparatuses 1. Note that the aggregation level indicates an aggregation level of the prescribed number of CCEs, and is associated with the total number of CCEs constituting one PDCCH and/or search space.

Note that the aggregation level may be associated, depending on a magnitude of the aggregation level, with a coverage corresponding to the PDCCH and/or search space or a DCI size (DCI format size, payload size) included in the PDCCH and/or search space.

Note that in a case that a PDCCH symbol starting position (start symbol) is configured for one control resource set, and the PDCCH in more than one control resource set can be detected in a prescribed duration, the type of the search space, the type of the aggregation level, and the number of PDCCH candidates for the PDCCH included in the control resource set may be configured for the time domain corresponding to each starting symbol. The type of the search space, the type of the aggregation level, and the number of PDCCH candidates for the PDCCH included in the control resource set may be configured for each control resource set, may be provided/configured via the DCI and/or higher layer signaling, or may be defined/configured in advance by specifications. Note that the number of PDCCH candidates may be the number of reductions of the PDCCH candidates for a prescribed aggregation level. Note that the prescribed duration may be 1 millisecond. The prescribed duration may be 1 microsecond. The prescribed duration may also be one slot duration. The prescribed duration may be one OFDM symbol duration. The prescribed duration may also be one mini-slot duration.

Note that in a case that the number of PDCCH symbol starting positions (start symbols) configured for one control resource set is more than one, that is, in a case that the PDCCH is blind detected (monitored) multiple times in a prescribed duration, the type of the search space, the type of the aggregation level, and the number of PDCCH candidates for the PDCCH included in the control resource set may be configured for the time domain corresponding to each starting symbol. The type of the search space, the type of the aggregation level, and the number of PDCCH candidates for the PDCCH included in the control resource set may be configured for each control resource set, may be provided/configured via the DCI and/or higher layer signaling, or may be defined/configured in advance by specifications. Note that the number of PDCCH candidates may be the number of reductions of the PDCCH candidates.

Note that the number of PDCCH candidates or the number of reductions of the PDCCH candidates may be defined/configured for each aggregation level.

In a case that the control resource sets the number of which is greater than a prescribed number can be configured for one or multiple serving cells/component carriers, the terminal apparatus 1 may transmit/notify the capability information associated with the blind detection to the base station apparatus 3.

In a case that the terminal apparatus 1 supports the first slot format and the second slot format, the terminal apparatus 1 may transmit/notify the capability information associated with the slot format to the base station apparatus 3.

In a case that the control resource sets the number of which is greater than a prescribed number can be configured in a prescribed duration of one or multiple serving cells/component carriers, the terminal apparatus 1 may transmit/notify the capability information associated with the blind detection to the base station apparatus 3.

Note that the capability information associated with the blind detection may include information indicating a maximum number of blind detections in a prescribed duration. The capability information associated with the blind detection may include information indicating that the PDCCH candidate can be reduced. The capability information associated with the blind detection may include information indicating whether or not the terminal apparatus 1 supports reducing the number of blind detections based on that the terminal apparatus 1 does not perform (or skip) monitoring the prescribed DCI format. The capability information associated with the blind detection may include information indicating a maximum number of blind-detectable control resource sets in a prescribed duration. The maximum number of the control resource sets and the maximum number of serving cells and/or component carriers capable of PDCCH monitoring may be configured as individual parameters, or may be configured as a common parameter. Note that in a case that the number of prescribed DCI formats is greater than one, information indicating whether to skip the monitoring for each DCI format may be included. The capability information associated with the blind detection may include information indicating a maximum number of control resource sets that can be simultaneously blind detected in a prescribed duration.

Note that the capability information associated with the blind detection may include information indicating a maximum value of the aggregation level supported by the terminal apparatus 1. Information indicating the maximum value of the aggregation level supported by the terminal apparatus 1 may be notified in a case that the aggregation level is greater than a prescribed value. The capability information associated with the blind detection may include information indicating a minimum value of the aggregation level supported by the terminal apparatus 1. The capability information associated with the blind detection may include a maximum value (the maximum number of OFDM symbols) for a time resource configurable for the control resource set supported by the terminal apparatus 1. The capability information associated with the blind detection may include a maximum value (maximum bandwidth, the maximum number of RBs) for a frequency resource configurable for the control resource set supported by the terminal apparatus 1.

Note that the capability information associated with the blind detection may include information indicating a processing time required for the blind detection of a reference control resource set (which may be referred to as a criterial control resource set or a reference control resource set). The capability information associated with the blind detection may include information indicating the maximum number of blind detections for the reference control resource set.

The reference control resource set may be a control resource set defined/configured by a prescribed search space, a prescribed aggregation level, the prescribed number of PDCCH candidates, the number of prescribed frequency resources (bandwidth), and the prescribed number of time resources (OFDM symbols). For example, the reference control resource set may be an OFDM symbol including the CSS and the USS, where in the CSS, the aggregation level is {4, 8} and the number of PDCCH candidates corresponding to the aggregation level are {4, 2}, and in the USS, the aggregation level is {1, 2, 4, 8}, the number of PDCCH candidates corresponding to the aggregation level may be {6, 6, 2, 2}, the number of frequency resources may be 110 RBs (20 MHz), and the number of time resources is two. The maximum processing time or maximum number of blind detections for the reference control resource set in such a case may be defined, and may be notified as capability information of the terminal apparatus 1.

In a case that the terminal apparatus 1 does not support the capability of detecting (blind detecting) the control resource sets the number of which is greater than a prescribed number in the prescribed duration, the terminal apparatus 1 may not transmit/notify the capability information associated with the blind detection. In a case that the base station apparatus 3 does not receive the capability information associated with the blind detection, the base station apparatus 3 may configure the control resource set to transmit the PDCCH so that the prescribed maximum number of blind detections is not exceeded.

In a case that the terminal apparatus 1 supports the mini-slot, the capability information associated with the blind detection may include information indicating the maximum number of blind detections in the slot and information indicating the maximum number of blind detections in the mini-slot. Note that in a case that multiple mini-slots is included in one slot, information indicating the maximum number of blind detections may be defined for each of the first to n-th mini-slots. By configuring the maximum number of blind detections for each of the mini-slots, the blind detection can be completed within the slot duration for late in the mini-slots included within the slot duration. That is, the maximum number of blind detections may be different for the first mini-slot and the last mini-slot in one slot.

The base station apparatus 3 may determine, based on the received capability information associated with the blind detection, values of the various parameters included in each of the configurations for the one or multiple control resource sets. For example, information/parameters indicating that a prescribed DCI format is not to be monitored may be configured for each control resource set. Information/parameters indicating that the PDCCH candidates are reduced may be configured for each control resource set.

The configuration for the control resource set may include a parameter indicating the PDCCH starting position (start symbol). The configuration for the control resource set may include a parameter indicating a time resource region of the control resource set (the number of OFDM symbols constituting the control resource set). The configuration for the control resource set may include a parameter indicating a frequency resource region of the control resource set (the number of resource blocks constituting the control resource set). The configuration for the control resource set may include a parameter indicating a type of mapping from the CCE to the REG. The configuration for the control resource set may include an REG bundle size. The configuration for the control resource set may include a parameter indicating a pseudo placement of PDCCH antenna ports in the control resource set (whether the PDCCH is used with the same resource as a prescribed antenna port). The configuration for the control resource set may include a parameter indicating a CCE aggregation level of the USS. The configuration for the control resource set may include a parameter indicating a period for monitoring the PDCCH and/or the control resource set. Depending on the PDCCH starting position, the maximum number of blind detections of the PDCCH may be configured individually.

In a case that the base station apparatus 3 limits the number of blind detections in a prescribed duration for the terminal apparatus 1, the base station apparatus 3 may include parameters for reducing the PDCCH candidates in the configuration for the control resource set.

The unit of the physical resource according to the present embodiment will be described below.

Figure 5:
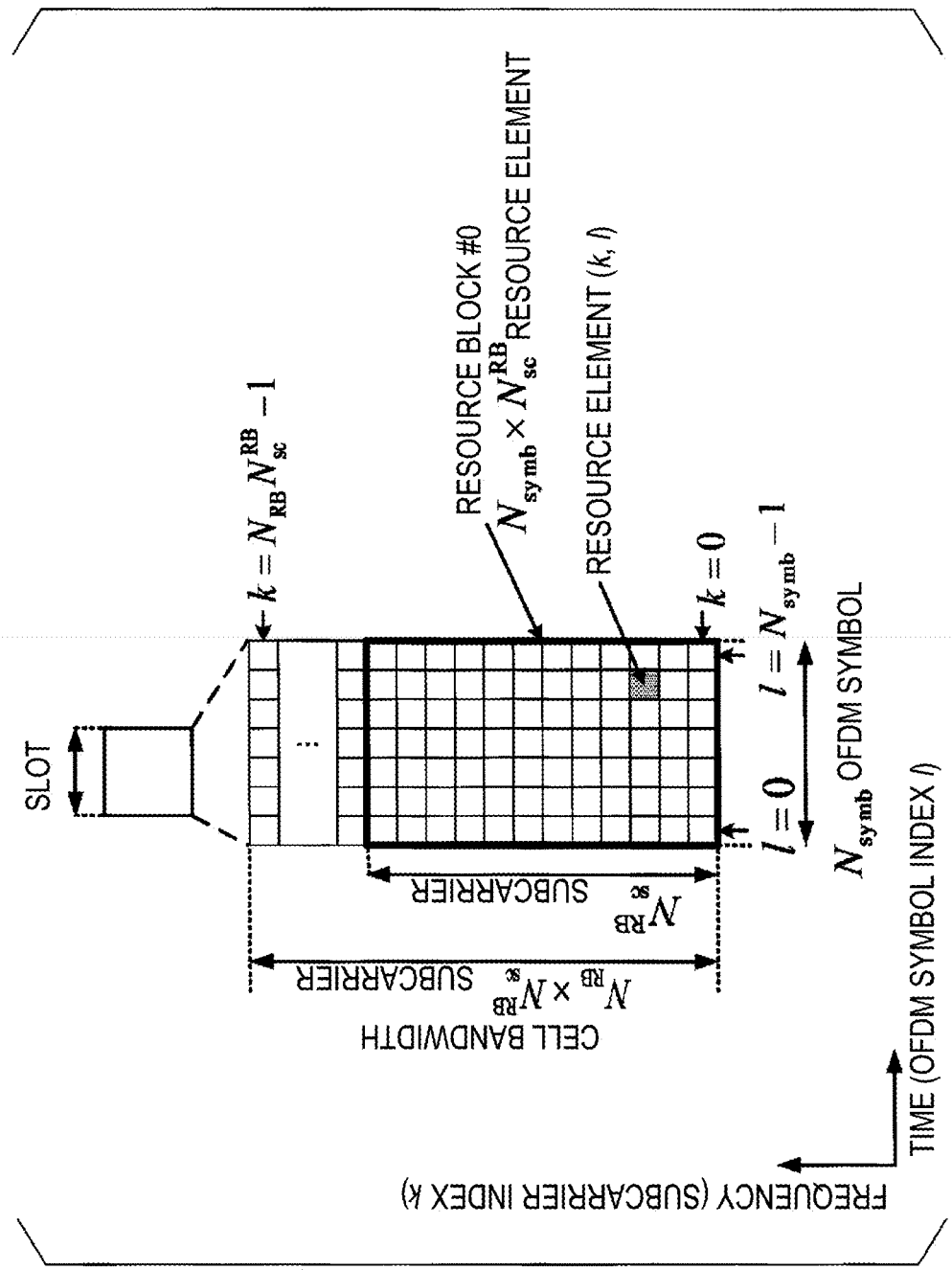
FIG. 5 is a diagram illustrating an example of resource elements included in the slot according to the one aspect of the present embodiment.

FIG. 5 is a diagram illustrating an example of resource elements included in the slot according to the one aspect of the present embodiment. Here, the resource element is a resource defined by one OFDM symbol and one subcarrier. As illustrated in FIG. 5, the slot includes $N_{symb}$ pieces of OFDM symbols. The number of subcarriers included in the slot may be given by a product of the number of resource blocks $N_{RB}$ included in the slot and the number of subcarriers per resource block $N^{RB}_{SC}$. Here, the resource block is a group of the resource elements in the time domain and the frequency domain. The resource block may be used as a unit of resource allocation in the time domain and/or the frequency domain. For example, the $N^{RB}_{SC}$ may be 12. The $N_{symb}$ may be the same as the number of OFDM symbols included in the subframe. The $N_{symb}$ may be the same as the number of OFDM symbols included in the slot. $N_{RB}$ may be given based on a bandwidth of a cell and the first subcarrier spacing. The $N_{RB}$ may also be given based on the bandwidth of the cell and the second subcarrier spacing. The $N_{RB}$ may be given based on higher layer signaling (for example, RRC signaling) transmitted from the base station apparatus 3, and the like. Additionally, the $N_{RB}$ may be given based on the description in the specifications, and the like. The resource element is identified by an index k for the subcarrier and an index l for the OFDM symbol.

Figure 6:
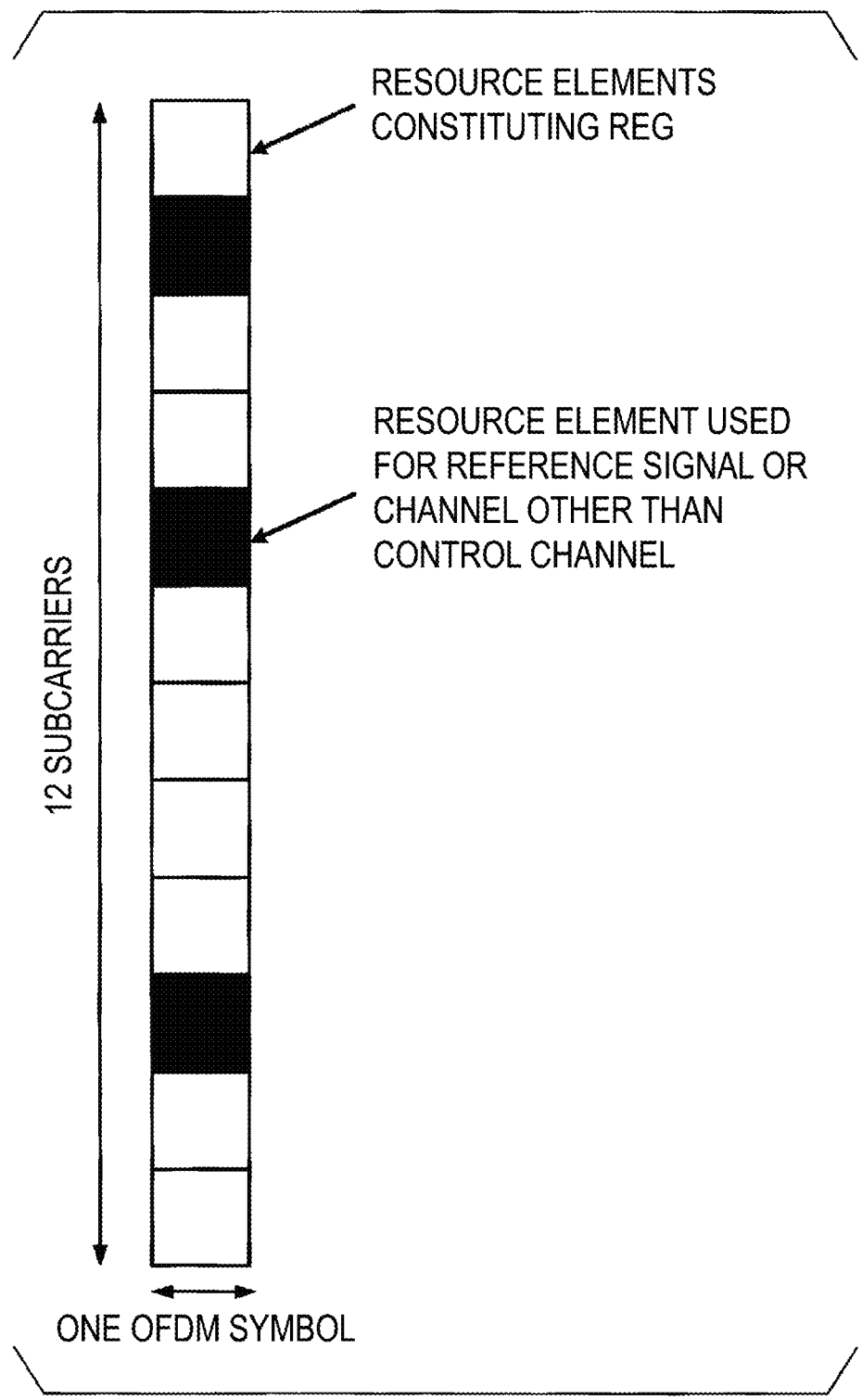
FIG. 6 is a diagram illustrating an example of a configuration of one REG according to the one aspect of the present embodiment.

FIG. 6 is a diagram illustrating an example of a configuration of one REG according to the one aspect of the present embodiment. The REG may include one OFDM symbol in one PRB. That is, the REG may include 12 pieces of continuous REs in the frequency domain. Some of the REs constituting the REG may be a RE to which the downlink control information is not mapped. The REG may be configured to include the RE to which the downlink control information is not mapped or may be configured not to include the RE to which the downlink control information is not mapped. The RE to which the downlink control information is not mapped may be a RE to which the reference signal is mapped, may be a RE to which a channel other than the control channel is mapped, or may be a RE which the terminal apparatus 1 assumes to have no control channel mapped.

Figure 7:
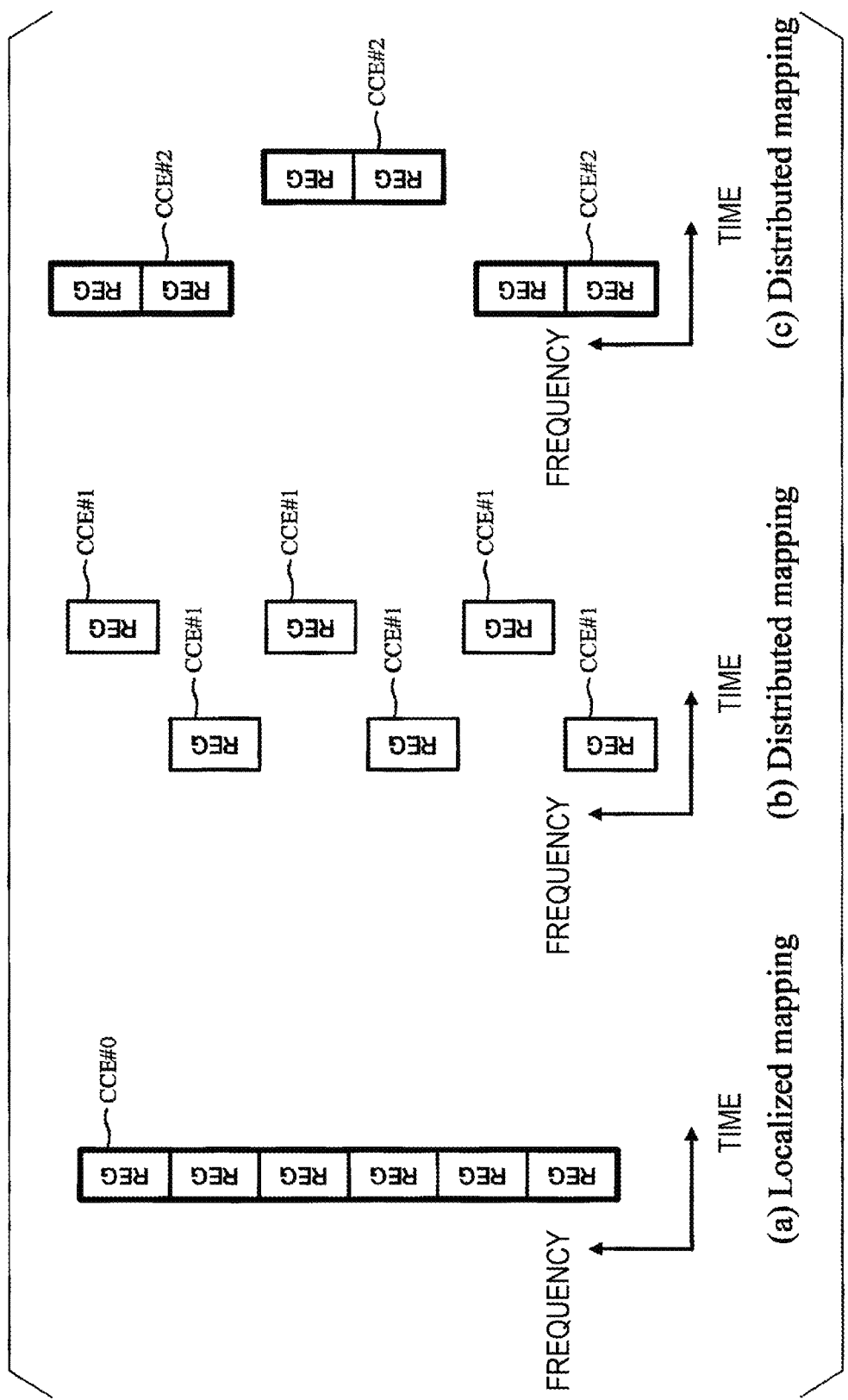
FIG. 7 is a diagram illustrating a configuration example of CCEs according to the one aspect of the present embodiment.

FIG. 7 is a diagram illustrating a configuration example of CCEs according to the one aspect of the present embodiment. The CCE may include six REGs. As illustrated in FIG. 7(a), the CCE may include REGs continuously mapped (such mapping may be referred to as Localized mapping). As illustrated in FIG. 7(b), the CCE may include REGs non-continuously mapped (such mapping may be referred to as Distributed mapping). As illustrated in FIG. 7(c), the CCEs may include non-continuously mapped REG groups. In FIG. 7(c), the REG group includes the two REGs.

The CCE may be configured to include one or more REG groups. The REG group is also referred to as an REG bundle. The terminal apparatus 1 may assume that precoders applied to the REs in the REG group are the same. The terminal apparatus 1 can perform channel estimation assuming that the precoder applied to the REs in the REG group is the same. Meanwhile, the terminal apparatus 1 may assume that the precoders applied to the REs are not the same between the REG groups. In other words, the terminal apparatus 1 need not assume that the precoders applied to the REs are the same between the REG groups. The phrase "between the REG groups" may also be interpreted as "between the two different REG groups". The terminal apparatus 1 can perform the channel estimation assuming that the precoders applied to the REs are not the same between the REG groups. The details of the REG group are described later.

Figure 8:
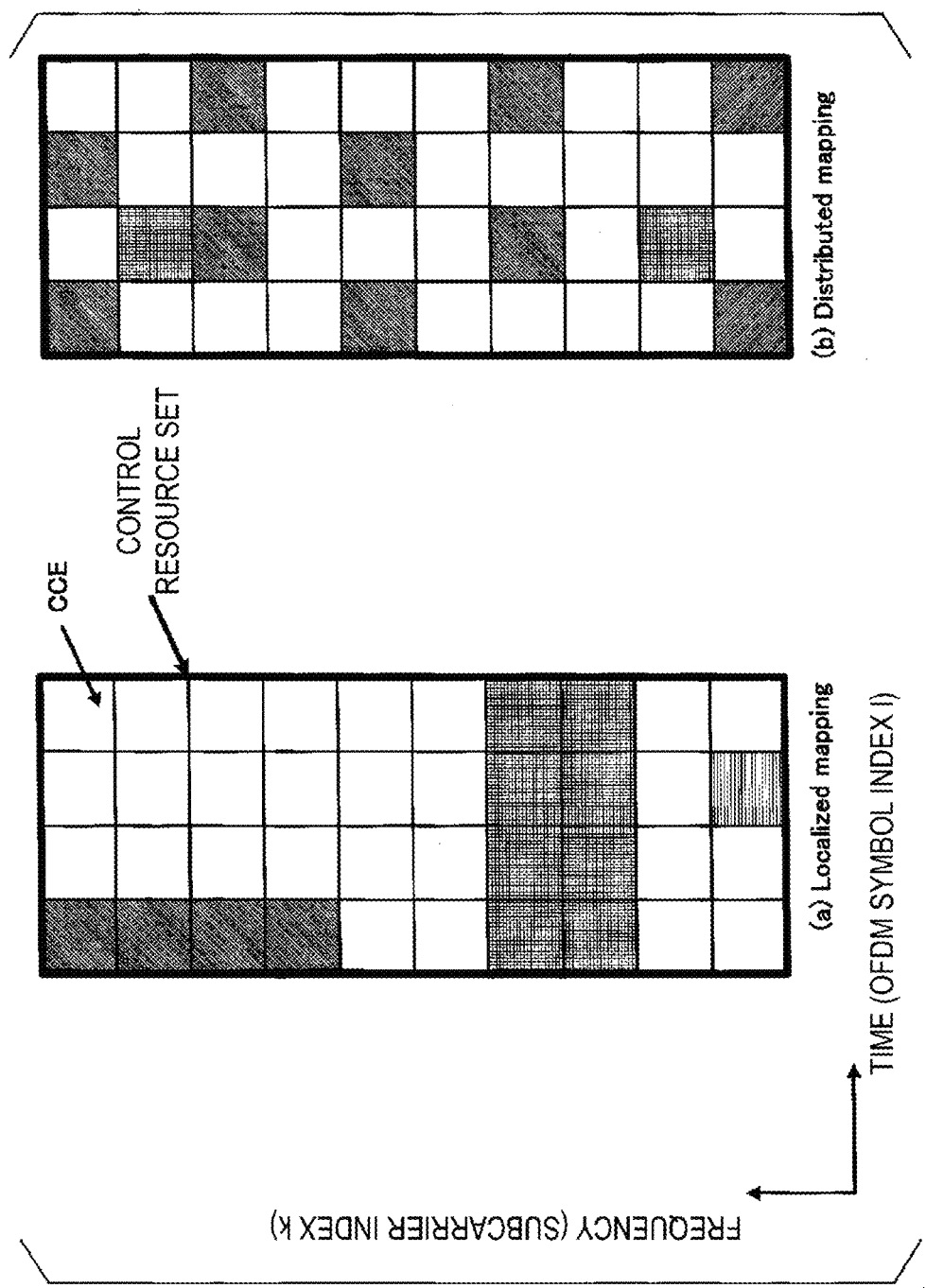
FIG. 8 is a diagram illustrating a configuration example of a PDCCH candidate according to the one aspect of the present embodiment.

FIG. 8 is a diagram illustrating a configuration example of a PDCCH candidate according to the one aspect of the present embodiment. In FIG. 8, the CCE includes the continuously mapped REGs as illustrated in FIG. 7(a). The PDCCH candidate is configured based on the CCEs. FIG. 8 illustrates an example of mapping the PDCCH candidate, assuming the CCEs including the continuously mapped REGs. As illustrated in FIG. 8(a), the PDCCH candidate may include CCEs continuously mapped (that is, the PDCCH candidate may be constituted based on the Localized mapping). As illustrated in FIG. 8(a), the PDCCH candidate may include four CCEs indicated by the diagonal lines, may include eight CCEs indicated by the grid lines, or may include one CCE indicated by the horizontal lines. As illustrated in FIG. 8(b), the PDCCH may include CCEs non-continuously mapped (that is, the PDCCH candidate may be constituted based on the Distributed mapping). As illustrated in FIG. 8(b), the PDCCH candidate may include 10 CCEs indicated by the diagonal lines, or may include two CCEs indicated by the grid lines.

The number of CCEs constituting the PDCCH candidate is also referred to as an Aggregation Level (AL). A collection of the PDCCH candidates with the aggregation level of $AL_X$ is also referred to as a search space with the aggregation level $AL_X$. In other words, the search space with the aggregation level $AL_X$ may include one or more PDCCH candidates with the aggregation level of $AL_X$. The search space may also include the PDCCH candidates with the multiple aggregation levels. For example, the CSS may include the PDCCH candidates with the multiple aggregation levels. The USS may include the PDCCH candidates with the multiple aggregation levels. A set of the aggregation levels of the PDCCH candidates included in the CSS and a set of the aggregation levels of the PDCCH candidates included in the USS may be separately defined/configured.

Hereinafter, the REG group will be described.

The REG group may be used for channel estimation in the terminal apparatus 1. For example, the terminal apparatus 1 performs the channel estimation for each REG group. This is based on a difficulty in performing the channel estimation (for example, MMSE channel estimation and the like) in the REs for the reference signals to which different precoders are applied. Here, the MMSE is an abbreviation for Minimum Mean Square Error.

The accuracy of channel estimation varies depending on at least a power allocated to the reference signal, a density of an RE in the time frequency domain, the RE being used for the reference signal, an environment of a radio channel, and the like. The accuracy of channel estimation varies depending on at least the time frequency domain used for the channel estimation. In various aspects of the present embodiment, the REG group may be used as a parameter to configure the time frequency domain used for the channel estimation.

That is, a larger REG group means that a higher gain of the channel estimation accuracy can be obtained. Meanwhile, a smaller REG group means that a larger number of REG groups are included in one PDCCH candidate. The larger number of REG groups being included in one PDCCH candidate is preferable for a transmission method (referred to as precoder rotation, precoder cycling, and the like) that obtains spatial diversity by applying different precoders to the respective REG groups.

One REG group may include the REGs in the time domain and/or the frequency domain.

The REG group in the time domain is preferable for improving the channel estimation accuracy and/or reduction in the reference signals. For example, the number of REGs constituting the REG group in the time domain may be 1, 2, 3, or another value. The number of REGs constituting the REG group in the time domain may be given based on at least the number of OFDM symbols included in the control resource set. Additionally, the number of REGs constituting the REG group in the time domain may be the same as the number of OFDM symbols included in the control resource set.

The REG group in the frequency domain contributes to the improvement of the channel estimation accuracy. For example, the number of REGs constituting the REG group in the frequency domain may be 2, 3, at least a multiple of 2, or at least a multiple of 3. Additionally, the number of REGs constituting the REG group in the frequency domain may be given based on at least the number of PRBs in the control resource set. Additionally, the number of REGs constituting the REG group in the frequency domain may be the same as the number of PRBs included in the control resource set.

Figure 9:
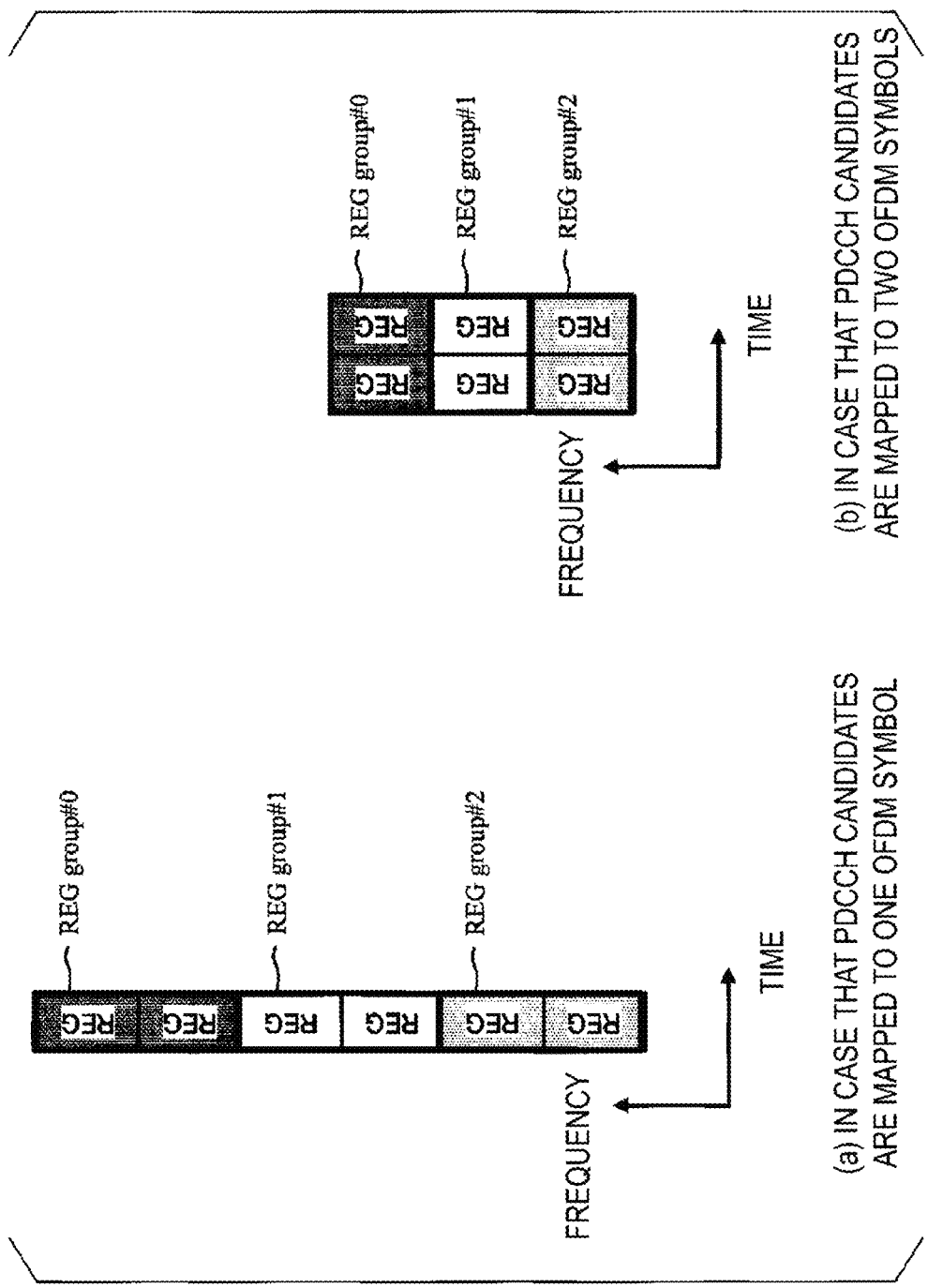
FIG. 9 is a diagram illustrating an example of a relationship between the number of REGs constituting an REG group and a mapping method of the PDCCH candidate according to the one aspect of the present embodiment.

The number of REGs constituting the REG group in the frequency domain may be given based on at least the mapping method of the PDCCH candidate. FIG. 9 is a diagram illustrating an example of a relationship between the number of REGs constituting an REG group and a mapping method of the PDCCH candidate according to the one aspect of the present embodiment. In one example illustrated in FIG. 9(a), the PDCCH candidates are mapped to one OFDM symbol, and three REG groups including two REGs are configured. In other words, in one example illustrated in FIG. 9(a), one REG group includes the two REGs. The number of REGs constituting the REG group in the frequency domain may include a divisor of the number of PRBs mapped in the frequency direction. In the example illustrated in FIG. 9(a), the number of REGs constituting the REG group in the frequency domain may be 1, 2, 3, or 6.

In one example illustrated in FIG. 9(b), the PDCCH candidates are mapped to two OFDM symbols, and three REG groups including two REGs are configured. In one example illustrated in FIG. 9(b), the number of REGs constituting the REG group in the frequency domain may be either 1 or 3.

The number of REGs constituting the REG group in the frequency domain may be given based on at least the number of OFDM symbols to which the PDCCH candidates are mapped. The number of REGs constituting the REG group in the frequency domain may be configured individually for the number of OFDM symbols to which the PDCCH candidate is mapped. The number of OFDM symbols to which the PDCCH candidates are mapped may differ based on whether the mapping of REGs constituting the CCE is Time first mapping or Frequency first mapping. That is, the number of REGs constituting the REG group in the frequency domain may be given based on at least the mapping of the REGs constituting the CCE. The number of REGs constituting the REG group in the frequency domain may be configured individually for the mapping of the REGs constituting the CCE. The mapping of the REGs constituting the CCE may be Time first mapping or Frequency first mapping. The mapping of the REGs constituting the CCE may be either continuous mapping or non-continuous mapping. The number of REGs constituting the REG group in the frequency domain may be given based on at least the number of OFDM symbols to which one CCE is mapped. The number of REGs constituting the REG group in the frequency domain may be configured individually for the number of OFDM symbols to which one CCE is mapped.

Figure 10:
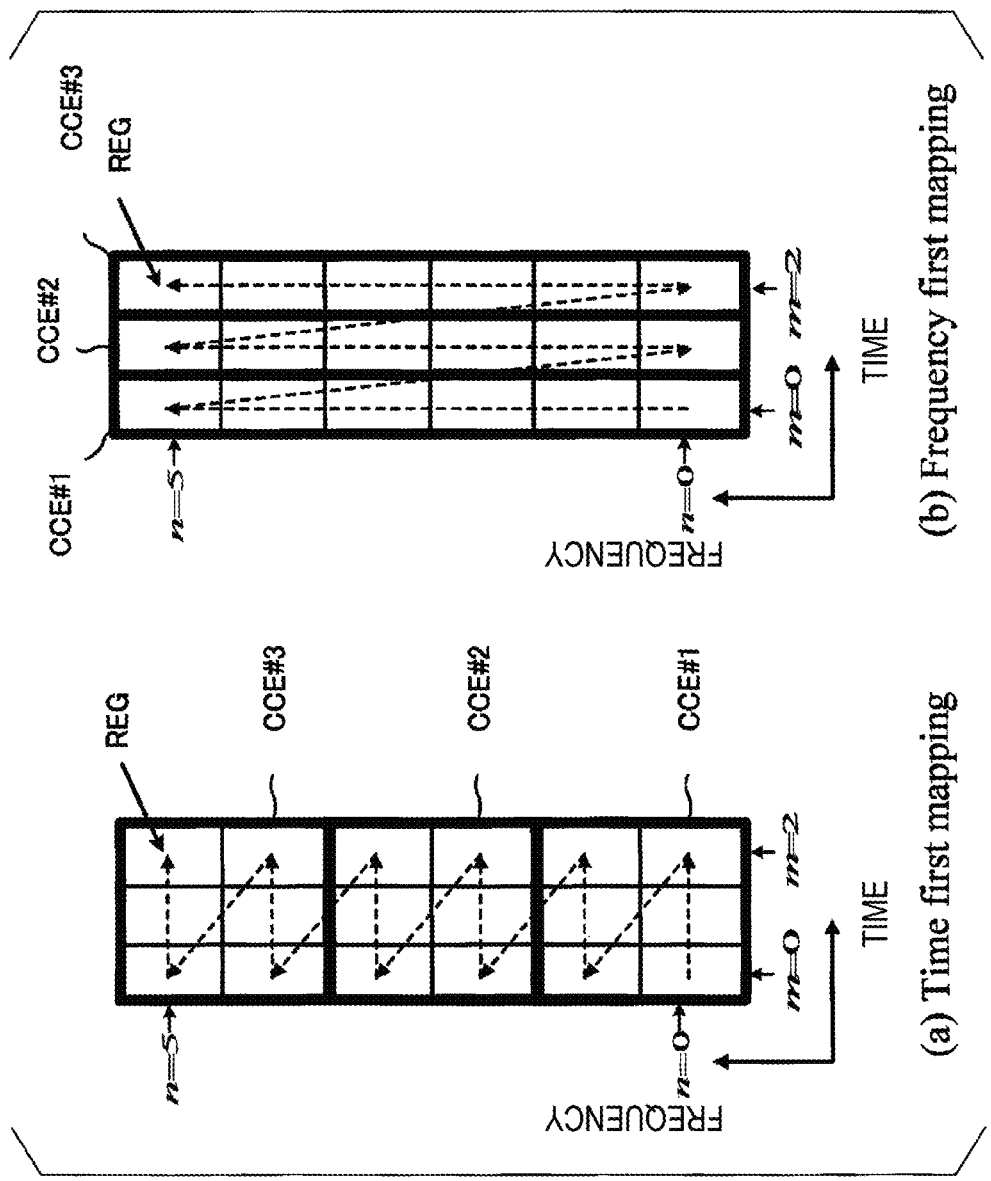
FIG. 10 is a diagram illustrating an example of the mapping of the REGs constituting the CCE according to the one aspect of the present embodiment.

FIG. 10 is a diagram illustrating an example of the mapping of the REGs constituting the CCE according to the one aspect of the present embodiment. In FIG. 10, the CCE includes the six REGs. In FIG. 10, values of m=0 to 2 are assigned to indices m of the REGs in the time domain from the left. In FIG. 10, values of n=0 to 5 are assigned to indices n of the REGs in the frequency domain from below. FIG. 10(a) illustrates an example in which the REGs constituting the CCE are mapped in a Time first manner. The Time first mapping is a mapping method that maps the REGs from a lower index to a higher index of the REGs in the time domain and increment the index of the REG in the frequency domain by one at a point of time when the index of the REG in the time domain reaches the maximum. FIG. 10(b) illustrates an example in which the REGs constituting the CCE are mapped in a Frequency first manner. The Frequency first mapping is a mapping method that maps the REGs from a lower index to a higher index of the REGs in the frequency domain and increment the index of the REG in the time domain by one at a point of time when the index of the REG in the frequency domain reaches the maximum.

The number of REGs constituting the REG group in the time domain may be given based on at least the number of OFDM symbols to which the PDCCH candidates are mapped. The number of REGs constituting the REG group in the time domain may be configured individually for the number of OFDM symbols to which the PDCCH candidates are mapped. The number of OFDM symbols to which the PDCCH candidates are mapped may differ based on whether the mapping of REGs constituting the CCE is Time first mapping or Frequency first mapping. That is, the number of REGs constituting the REG group in the time domain may be given based on at least the mapping of the REGs constituting the CCE. The number of REGs constituting the REG group in the time domain may be configured individually for the mapping of the REGs constituting the CCE. The mapping of the REGs constituting the CCE may be Time first mapping or Frequency first mapping. Alternatively, the mapping of the REGs constituting the CCE may be continuous mapping or non-continuous mapping. The number of REGs constituting the REG group in the time domain may be given based on at least the number of OFDM symbols to which one CCE is mapped. The number of REGs constituting the REG group in the time domain may be configured individually for the number of OFDM symbols to which one CCE is mapped.

The REG group in the time domain is also preferable for reduction in the reference signals. As illustrated in FIG. 9(b), in a case that the REG group is configured, the reference signal may be included in an anterior OFDM symbol and/or a posterior OFDM symbol. For example, in the time domain, the first REG (head REG) in the REG group may include a RE to which the downlink control information is not mapped, and REGs other than the first REG in the REG group need not include REs to which the downlink control information is not mapped.

A configuration example of the terminal apparatus 1 according to the one aspect of the present embodiment will be described below.

Figure 11:
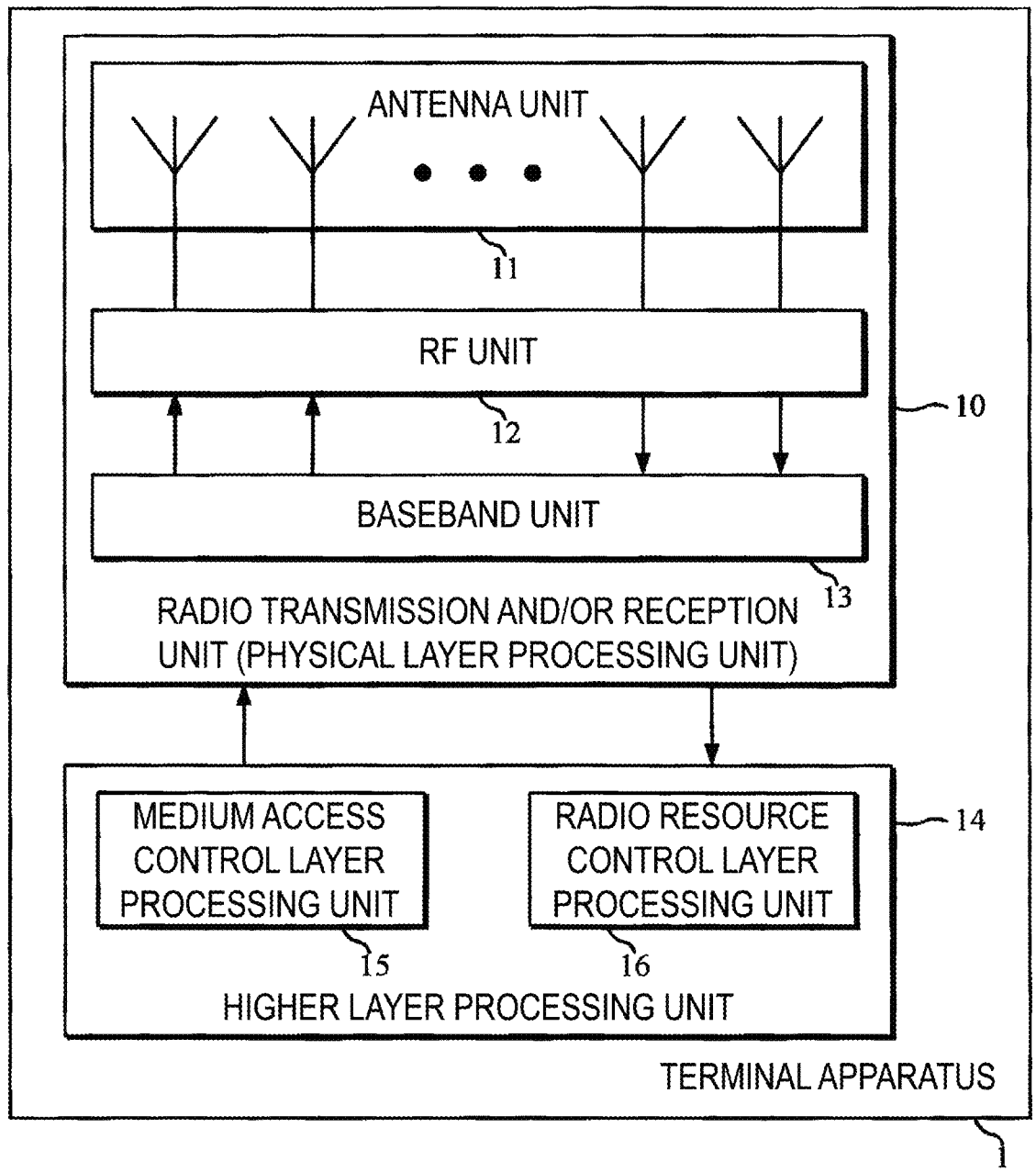
FIG. 11 is a schematic block diagram illustrating a configuration of a terminal apparatus 1 according to the present embodiment.

FIG. 11 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of a MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters based on a higher layer signal received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

A configuration example of the base station apparatus 3 according to one aspect of the present embodiment will be described below.

Figure 12:
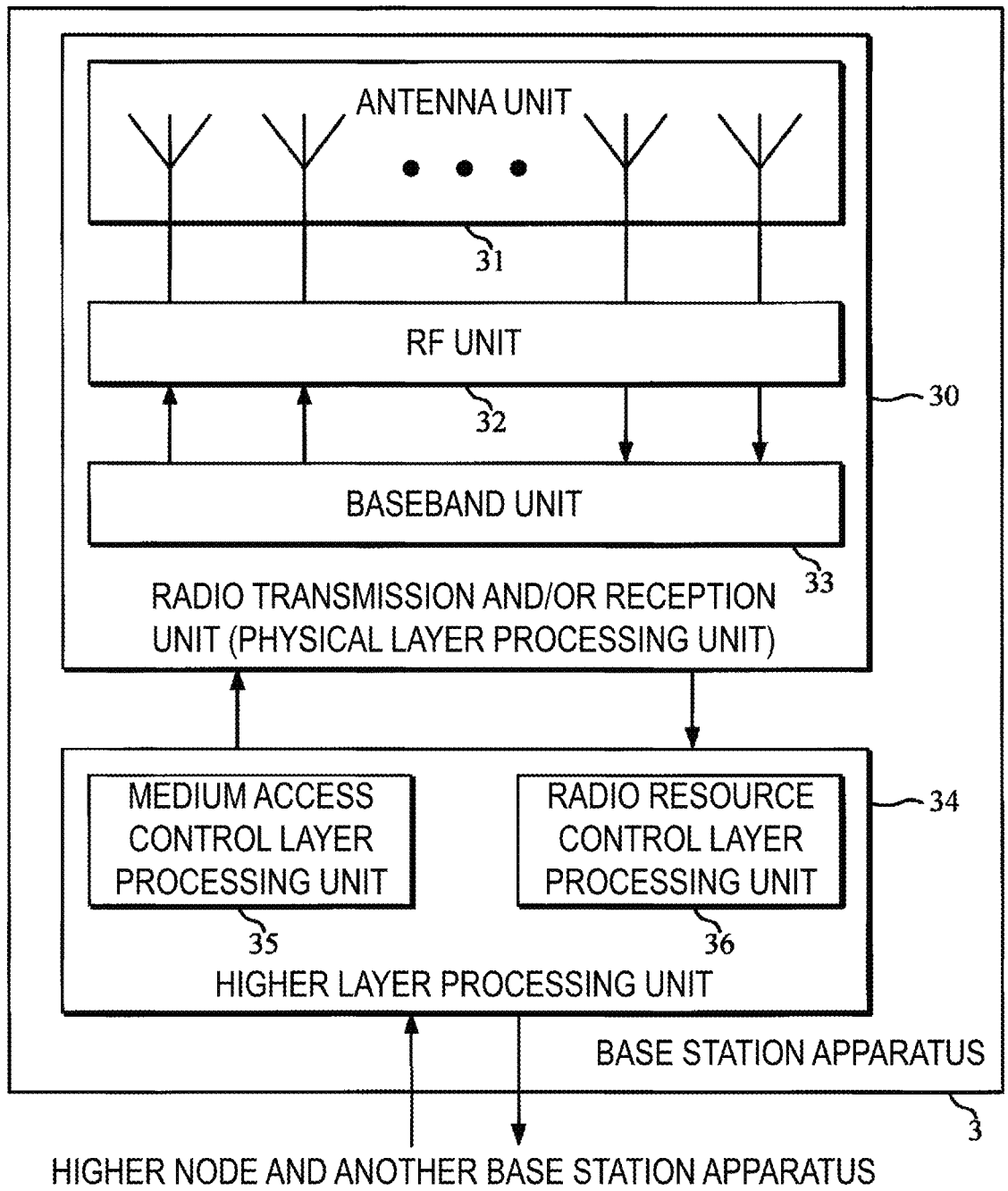
FIG. 12 is a schematic block diagram illustrating a configuration of a base station apparatus 3 according to the present embodiment.

FIG. 12 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of the MAC layer, the PDCP layer, the RLC layer, and the RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on PDSCH, system information, an RRC message, a MAC CE, and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

An example of an initial connection procedure according to the present embodiment will be described below.

The base station apparatus 3 includes a communicable range (or a communication area) controlled by the base station apparatus 3. The communicable range is divided into one or multiple cells (or serving cells, sub-cells, beams, and the like), and communications with the terminal apparatus 1 can be managed for each cell. Meanwhile, the terminal apparatus 1 selects at least one cell from the multiple cells and attempts to establish a connection with the base station apparatus 3. Here, a first state in which the connection between the terminal apparatus 1 and at least one cell of the base station apparatus 3 is established is also referred to as RRC Connection. A second state in which the terminal apparatus 1 has not established the connection with any cell of the base station apparatus 3 is also referred to as RRC idle. In addition, a third state in which the connection of the terminal apparatus 1 with at least one cell of the base station apparatus 3 is established but some functions are limited between the terminal apparatus 1 and the base station apparatus 3 is also referred to as RRC suspended. The RRC suspended is also referred to as RRC inactive.

Figure 13:
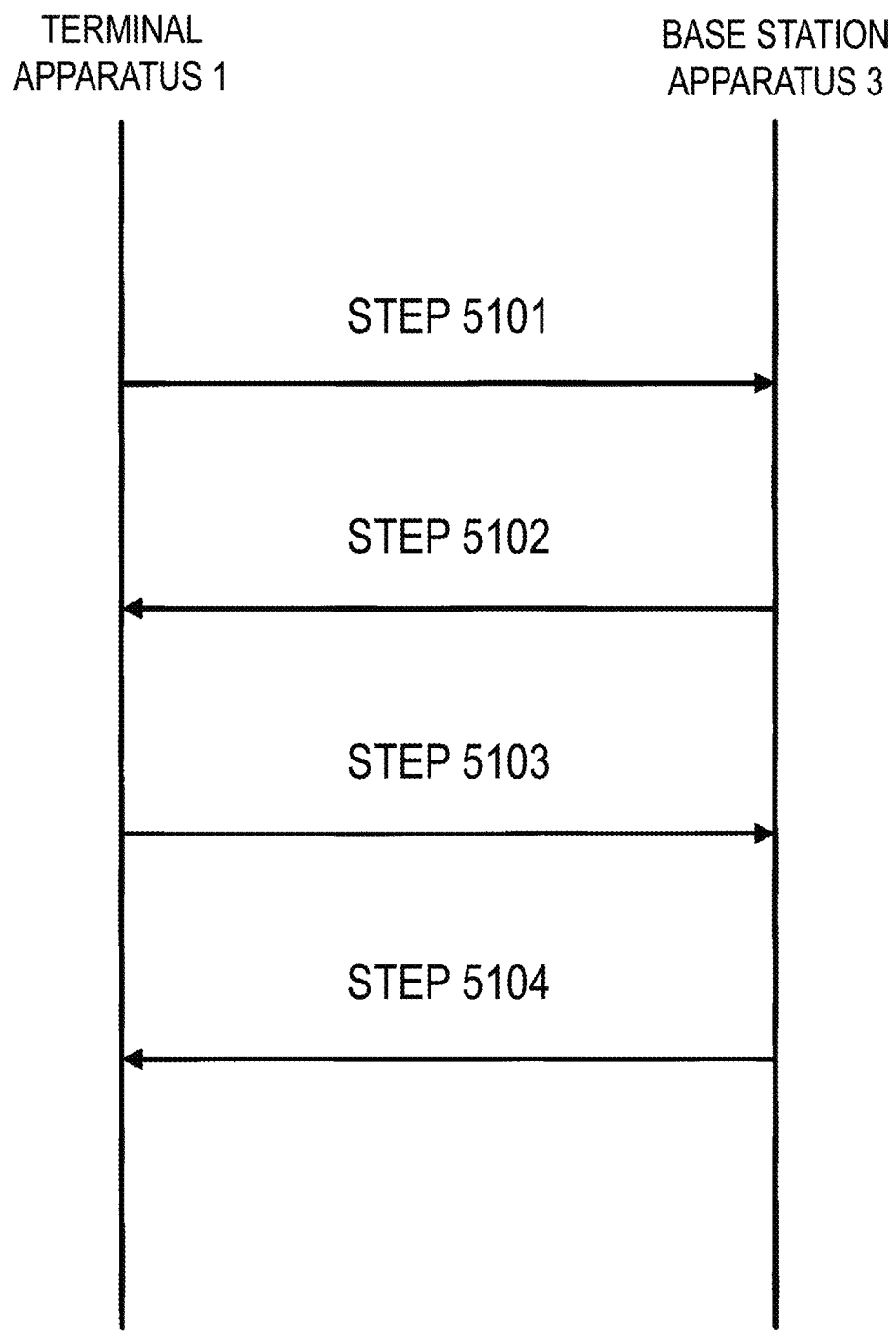
FIG. 13 is a diagram illustrating an example of a first initial connection procedure (4-step contention based RACH procedure) according to the one aspect of the present embodiment.

The terminal apparatus 1 in RRC idle may attempt to establish a connection with at least one cell of the base station apparatus 3. Here, the cell to which the terminal apparatus 1 attempts to connect is also referred to as a target cell. FIG. 13 is a diagram illustrating an example of a first initial connection procedure (4-step contention based RACH procedure) according to the one aspect of the present embodiment. The first initial connection procedure includes at least some of Steps 5101 to 5104.

Step 5101 is a step in which the terminal apparatus 1 requests, via a physical channel, a target cell to respond for initial connection. Alternatively, step 5101 is a step in which the terminal apparatus 1 performs initial transmission to the target cell via the physical channel. Here, the physical channel may be a PRACH, for example. The physical channel may be a channel dedicatedly used to request a response for initial connection. Moreover, the physical channel may be the PRACH. In step 5101, the message transmitted from the terminal apparatus 1 via the physical channel is also referred to as a random access message 1. A random access message 1 may be generated based on a random access preamble index u provided by the higher layer of the terminal apparatus.

The terminal apparatus 1 performs downlink time-frequency synchronization prior to performing step 5101. In a first state, a synchronization signal is used for the terminal apparatus 1 to establish downlink time-frequency synchronization.

The synchronization signal may be transmitted with an ID (cell ID) of the target cell included therein. The synchronization signal may be transmitted with a sequence generated based on at least the cell ID included therein. The synchronization signal including the cell ID may mean that a sequence of synchronization signals is provided based on the cell ID. The synchronization signal may be transmitted with a beam (or precoder) applied thereto.

The beam exhibits a phenomenon that antenna gain varies according to the direction. The beam may be provided based on at least the directivity of the antenna. Moreover, the beam may be provided based on at least the phase shift of the carrier signal. Moreover, the beam may be provided by application of a precoder.

The terminal apparatus 1 receives the PBCH transmitted from the target cell. The PBCH may be transmitted that includes essential information block (Master Information Block (MIB) and Essential Information Block (EIB)) including the essential system information used for the connection of the terminal apparatus 1 with the target cell. The essential information block is system information. The essential information block may include information on the radio frame number. The essential information block may include information on a position in a super frame including multiple radio frames (e.g., information for indicating at least some of System Frame Numbers (SFNs) in the super frame). The PBCH may include an index of the synchronization signal. The PBCH may include information on the reception of a PDCCH. The essential information block may be mapped to a BCH in a transport channel. The essential information block may be mapped to a BCCH in a logical channel.

The information relating to reception of the PDCCH may include information for indicating a control resource set. The information for indicating the control resource set may include information relating to the number of PRBs to which the control resource set is mapped. The information for indicating the control resource set may include information for indicating mapping of the control resource set. The information for indicating the control resource set may include information relating to the number of OFDM symbols to which the control resource set is mapped. The information for indicating the control resource set may include information for indicating the period (periodicity) of the slot to which the control resource set is mapped. The terminal apparatus 1 may attempt to receive the PDCCH based on at least the information for indicating the control resource set included in the PBCH.

The Information relating to reception of the PDCCH may include information relating to an ID for indicating the destination of the PDCCH. The ID for indicating the destination of the PDCCH may be an ID used for scrambling the CRC-bits to be added to the PDCCH. The ID for indicating the destination of the PDCCH is also referred to as a Radio Network Temporary Identifier (RNTI). Information relating to the ID used for scrambling the CRC bits added to the PDCCH may be included. The terminal apparatus 1 may attempt to receive the PDCCH based on at least the information relating to the ID included in the PBCH.

The RNTI may include a System Information-RNTI (SI-RNTI), a Paging-RNTI (a P-RNTI), a Common RNTI (C-RNTI), a Temporary C-RNTI, and a Random Access-RNTI (RA-RNTI). The SI-RNTI is used at least for scheduling the PDSCH transmitted with system information included therein. The P-RNTI is used at least for scheduling the PDSCH transmitted with paging information and/or information such as notification of change of the system information included therein. The C-RNTI is used at least for scheduling user data to the terminal apparatus 1 in RRC connection. The Temporary C-RNTI is used at least for scheduling a random access message 4. The Temporary C-RNTI is used at least for scheduling of the PDSCH including data to be mapped to a CCCH in the logical channel. The RA-RNTI is used at least for scheduling of the random access message 2.

The information relating to reception of the PDCCH may include information relating to an aggregation level of the search space included in the control resource set. The terminal apparatus 1 may identify the aggregation level of PDCCH candidates whose reception should be attempted and determine the search space, based on at least the information relating to the aggregation level of the search space included in the control resource set included in the PBCH.

The information relating to reception of the PDCCH may include information relating to a method for mapping an REG constituting the CCE. The information relating to the method for mapping the REG constituting the CCE may include information for indicating continuous mapping and non-continuous mapping. The information relating to the method for mapping the REG constituting the CCE may include information for indicating whether the method for mapping the REG constituting the CCE is Time-first mapping or Frequency-first mapping.

The information on the reception of the PDCCH may include information on the REG group. The information on the reception of the PDCCH may include information for indicating the number of REGs constituting the REG group in the frequency domain. The information on the reception of PDCCH may include information for indicating the number of REGs constituting the REG group in the time domain.

The information on the REG group may include at least some or all of a first configuration, a second configuration, and a third configuration. The first configuration indicates at least some or all of a configuration 1A to a configuration 1H. (Configuration 1A) The number of REGs constituting the REG group in the frequency domain is equal to the number of PRBs constituting the control resource set. (Configuration 1B) The number of REGs constituting the REG group in the time domain is equal to the number of OFDM symbols constituting the control resource set. (Configuration 1C) The terminal apparatus 1 assumes that the precoders applied to the physical resources (CCE, REG, and the like) in the control resource set are the same. Alternatively, the terminal apparatus 1 assumes that the precoders applied to all of the physical resources (CCE, REG, and the like) in the control resource set are the same. (Configuration 1D) The terminal apparatus 1 assumes that the reference signal corresponding to the control resource set has been transmitted regardless of whether the PDCCH is detected in the control resource set. Alternatively, the terminal apparatus 1 assumes that the reference signal corresponding to the control resource set is always transmitted. (Configuration 1E) The reference signal corresponding to the control resource set is used for tracking of the time frequency domain (calibration of the time frequency domain). (Configuration 1F) The REG group in the frequency domain and/or the time domain is configured across at least two or more CCEs. (Configuration 1G) The reference signal included in the control resource set is used for channel measurement in the higher layer. (Configuration 1H) The number of transmission antenna ports of PDCCH included in the control resource set is configured to 1, 2, or 4.

In the configuration 1G, the channel measurement in the higher layer may include, for example, Reference Signal Received Power (RSRP).

In the first configuration, the RS corresponding to the control resource set may be Shared RS. In the first configuration, the RS included in the control resource set may be Shared RS.

The second configuration indicates at least some or all of the configurations 2A to 2C: (Configuration 2A) The number of REGs constituting the REG group in the frequency domain, (Configuration 2B) The number of REGs constituting the REG group in the time domain, (Configuration 2C) The number of transmission antenna ports for the PDCCH included in the control resource set.

The third configuration indicates that the number of REGs constituting the REG group in the frequency domain and/or the number of REGs constituting the REG group in the time domain is given based on at least the various parameters of the control resource set. The various parameters of the control resource set may be included in the information on the reception of the PDCCH. The various parameters of the control resource set may include the number of PRBs included in the control resource set. The various parameters of the control resource set may include the number of OFDM symbols included in the control resource set. The various parameters of the control resource set may include the mapping method of the REGs constituting the CCE. The various parameters of the control resource set may include the number of transmission antenna ports for the PDCCH included in the control resource set. The various parameters of the control resource set may include the aggregation level of the search space included in the control resource set.

Whether the PDCCH included in a control resource set B is mapped to the RE for a reference signal A corresponding to a control resource set A may be given based on at least whether any of the first configuration, the second configuration, or the third configuration is applied to the control resource set A.

Furthermore, whether the PDCCH is mapped to the RE for the reference signal A may be based on whether the RE for the reference signal A and the RE used for the PDCCH overlap. The PDCCH need not include the reference signal B corresponding to the PDCCH.

Whether the PDSCH scheduled by the PDCCH included in the control resource set B is mapped to the RE for the reference signal corresponding to the control resource set A may be given based on at least whether any of the first configuration, the second configuration, or the third configuration is applied to the control resource set A. Furthermore, whether the PDSCH is mapped to the RE may be based on whether the RE and the RE used for the PDSCH overlap.

Furthermore, whether the PDSCH is mapped to the RE for the reference signal A may be based on whether the RE for the reference signal A and the RE used for the PDSCH overlap. The PDSCH need not include the reference signal B corresponding to the PDSCH.

In a case that the first configuration is applied to the control resource set A, the PDCCH included in the control resource set A need not be mapped to the RE for the reference signal corresponding to the control resource set A. In a case that the first configuration is applied to the control resource set A, the PDCCH included in the control resource set A may be mapped to the RE for the reference signal corresponding to the control resource set B. In a case that the first configuration is applied to the control resource set A, the PDCCH included in the control resource set B need not be mapped to the RE for the reference signal corresponding to the PDCCH and/or the RE for the reference signal corresponding to the control resource set A. The RE for the reference signal corresponding to the control resource set may be the RE to which the PDCCH included in the control resource set is not mapped. The RE for the reference signal corresponding to the PDCCH may be the RE to which the PDCCH is not mapped.

In a case that the first configuration is applied to the control resource set A, the PDSCH scheduled by the PDCCH included in the control resource set A need not be mapped to the RE for the reference signal corresponding to the control resource set A and/or the RE for the reference signal corresponding to the PDSCH. In a case that the first configuration is applied to the control resource set A, the PDSCH scheduled by the PDCCH included in the control resource set A may be mapped to the RE for the reference signal corresponding to the control resource set B. In a case that the first configuration is applied to the control resource set A, the PDSCH scheduled by the PDCCH included in the control resource set B need not be mapped to the RE for the reference signal corresponding to the PDSCH, the RE for the reference signal corresponding to the control resource set A, and/or the RE for the reference signal corresponding to the PDCCH. The RE for the reference signal corresponding to the PDSCH may be the RE to which the PDSCH is not mapped.

In a case that the second configuration is applied to the control resource set A, the PDCCH included in the control resource set A need not be mapped to the RE for the reference signal corresponding to the PDCCH. In a case that the second configuration is applied to the control resource set A, the PDCCH included in the control resource set A may be mapped to the RE for the reference signal corresponding to the control resource set B. In a case that the second configuration is applied to the control resource set A, the PDCCH included in the control resource set B need not be mapped to the RE for the reference signal corresponding to the PDCCH. In a case that the second configuration is applied to the control resource set A, the PDCCH included in the control resource set B may be mapped to the RE for the reference signal corresponding to the control resource set A.

In a case that the second configuration is applied to the control resource set A, the PDSCH scheduled by the PDCCH included in the control resource set A need not be mapped to the RE for the reference signal corresponding to the PDCCH and/or the RE for the reference signal corresponding to the PDSCH. In a case that the second configuration is applied to the control resource set A, the PDSCH scheduled by the PDCCH included in the control resource set A may be mapped to the RE for the reference signal corresponding to the control resource set B. In a case that the second configuration is applied to the control resource set A, the PDSCH scheduled by the PDCCH included in the control resource set B need not be mapped to the RE for the reference signal corresponding to the PDSCH and/or the RE for the reference signal corresponding to the PDSCH. In a case that the second configuration is applied to the control resource set A, the PDSCH scheduled by the PDCCH included in the control resource set B may be mapped to the RE for the reference signal corresponding to the control resource set A.

In a case that the third configuration is applied to the control resource set A, the PDCCH included in the control resource set A need not be mapped to the RE for the reference signal corresponding to the PDCCH. In a case that the third configuration is applied to the control resource set A, the PDCCH included in the control resource set A may be mapped to the RE for the reference signal corresponding to the control resource set B. In a case that the third configuration is applied to the control resource set A, the PDCCH included in the control resource set B need not be mapped to the RE for the reference signal corresponding to the PDCCH. In a case that the third configuration is applied to the control resource set A, the PDCCH included in the control resource set B may be mapped to the RE for the reference signal corresponding to the control resource set A.

In a case that the third configuration is applied to the control resource set A, the PDSCH scheduled by the PDCCH included in the control resource set A need not be mapped to the RE for the reference signal corresponding to the PDCCH and/or the RE for the reference signal corresponding to the PDSCH. In a case that the third configuration is applied to the control resource set A, the PDSCH scheduled by the PDCCH included in the control resource set A may be mapped to the RE for the reference signal corresponding to the control resource set B. In a case that the third configuration is applied to the control resource set A, the PDSCH scheduled by the PDCCH included in the control resource set B need not be mapped to the RE for the reference signal corresponding to the PDCCH and/or the RE for the reference signal corresponding to the PDSCH. In a case that the third configuration is applied to the control resource set A, the PDSCH scheduled by the PDCCH included in the control resource set B may be mapped to the RE for the reference signal corresponding to the control resource set A.

The reference signals corresponding to the control resource set may correspond to multiple PDCCH candidates included in the control resource set. The reference signals corresponding to the control resource set may be used for demodulation of the multiple PDCCHs included in the control resource set.

The base station apparatus 3 can transmit the PBCH including information on the reception of the PDCCH and indicate monitoring of a first control resource set to the terminal apparatus 1. The terminal apparatus 1 monitors the first control resource set based on at least detecting of information relating to reception of the PDCCH included in the PBCH. The first control resource set is used at least for scheduling of the first system information. The first system information may include system information important for the terminal apparatus 1 to connect to the target cell. The first system information may include information on various configurations of downlink. The first system information may include information on various configurations of PRACH. The first system information may include information on various configurations of uplink. The first system information may include information of a signal waveform (OFDM or DFT-s-OFDM) configured for random access message 3 transmission. The first system information may include at least a part of the system information other than information included in the MIB. The first system information may be mapped to the BCH in the transport channel. The first system information may be mapped to the BCCH in the logical channel. The first system information may include at least System Information Block type 1 (SIB1). The first system information may include at least System Information Block type 2 (SIB2). The first control resource set may be used for scheduling the random access message 2. The SIB1 may include information relating to a measurement required to perform RRC connection. Moreover, the SIB2 may include information relating to a channel which is common and/or shared among multiple terminal apparatuses 1 in a cell.

The terminal apparatus 1 may monitor the PDCCH based on at least the information on the reception of the PDCCH. The terminal apparatus 1 may monitor the PDCCH based on at least the information on the REG group. Based on at least the information on the reception of the PDCCH, whether any of the first configuration, the second configuration, or the third configuration is applied for monitoring the PDCCH may be given. The terminal apparatus 1 may assume the configuration applied for monitoring the PDCCH based on at least the information on the reception of the PDCCH.

For example, based on at least whether the frequency band of the control resource set is given based on the frequency band of the synchronization signal and/or the PBCH, whether any of the first configuration, the second configuration, or the third configuration is applied for monitoring the PDCCH may be given. For example, in a case that the frequency band of the control resource set is given based on at least the frequency band of the synchronization signal and/or the PBCH, the first configuration may be applied for monitoring the PDCCH. Furthermore, in a case that the frequency band of the control resource set is the same as the frequency band of the synchronization signal and/or the PBCH, the first configuration may be applied for monitoring the PDCCH. The third configuration may be applied in a case that the frequency band of the control resource set is not based on the frequency band of the synchronization signal and/or the PBCH.

For example, based on at least whether the frequency band of the control resource set overlaps with a part or all of the frequency band of the synchronization signal and/or the PBCH, whether any of the first configuration, the second configuration, or the third configuration is applied for monitoring of the PDCCH may be given. For example, in a case that the frequency band of the control resource set overlaps with a part or all of the frequency band of the synchronization signal and/or the PBCH, the first configuration may be applied for monitoring the PDCCH. Furthermore, in a case that the frequency band of the control resource set differs from the frequency band of the synchronization signal and/or the PBCH, the third configuration may be applied.

For example, based on at least the RNTI used for monitoring the PDCCH in the control resource set, whether any of the first configuration, the second configuration, or the third configuration is applied for monitoring the PDCCH may be given. For example, in a case that at least the SI-RNTI is used for monitoring the PDCCH in the control resource set, the first configuration may be applied. In a case that at least the P-RNTI is used for monitoring the PDCCH in the control resource set, the first configuration may be applied.

For example, based on at least the mapping method of the REGs constituting the CCE included in the control resource set, whether any of the first configuration, the second configuration, or the third configuration is applied for monitoring the PDCCH may be given. For example, in a case that the mapping method of the REGs constituting the CCE included in the control resource set is non-continuous mapping (distributed mapping), the first configuration may be applied for monitoring the PDCCH. In addition, in a case that the mapping method of the REGs constituting the CCE included in the control resource set is continuous mapping (localized mapping), the third configuration may be applied for monitoring the PDCCH. For example, in a case that the mapping method of the REGs constituting the CCE included in the control resource set is Frequency first mapping, the first configuration may be applied for monitoring the PDCCH. In addition, in a case that the mapping method of the REGs constituting the CCE included in the control resource set is Time first mapping, the third configuration may be applied for monitoring the PDCCH.

For example, the mapping method of the REGs constituting the CCE included in the control resource set may be given based on at least the number of OFDM symbols included in the control resource set. For example, in a case that the number of OFDM symbols included in the control resource set is one, the mapping method of the REGs constituting the CCE included in the control resource set may be Frequency first mapping. In addition, in a case that the number of OFDM symbols is larger than 1, the mapping method of the REGs constituting the CCE included in the control resource set may be Time first mapping.

The base station apparatus 3 can transmit the MIB and/or the first system information and indicate the monitoring of the second control resource set to the terminal apparatus 1. The first system information may include the information on the reception of the PDCCH. The terminal apparatus 1 monitors the second control resource set based on at least the MIB and/or the information on the reception of the PDCCH included in the first system information. The second control resource set may be used for scheduling of the PDSCH including the paging information and/or the information for the change notification of system information. The second control resource set and the first control resource set may be the same.

The base station apparatus 3 can transmit the MIB and/or the first system information and indicate the monitoring of the third control resource set to the terminal apparatus 1. The terminal apparatus 1 monitors the third control resource set based on at least the MIB and/or the information on the reception of the PDCCH included in the first system information. The third control resource set may be used to schedule the PDSCH including the second system information. The second system information may be the system information not included in the MIB and the first system information. The second system information may be transmitted based on at least a request from the terminal apparatus 1. The request from the terminal apparatus 1 may be performed based on at least the transmission of the random access message 1, the random access message 3, and/or the PUCCH. The third control resource set may be the same as the first control resource set and/or the second control resource set.

Step 5102 is a step in which the base station apparatus 3 performs a response to the random access message 1 from the terminal apparatus 1. The response is also referred to as the random access message 2. The random access message 2 may be transmitted via the PDSCH. The PDSCH including the random access message 2 is scheduled by the PDCCH. The CRC bits included in the PDCCH may be scrambled by the RA-RNTI. The random access message 2 may be transmitted with a special uplink grant included therein. The special uplink grant is also referred to as a random access response grant. The special uplink grant may be included in the PDSCH including the random access message 2. The random access response grant may include at least a Temporary C-RNTI.

The base station apparatus 3 can transmit the MIB, the first system information, and/or the second system information, and indicate monitoring of a fourth control resource set to the terminal apparatus 1. The second system information may include the information on the reception of the PDCCH. The terminal apparatus 1 monitors the fourth control resource set based on at least the MIB, and the information on the reception of the PDCCH included in the first system information and/or the second system information. The number of CRC bits added to the PDCCH may be scrambled with Temporary C-RNTI. The fourth control resource set may be used for scheduling of the random access message 2. The fourth control resource set may be the same as the first control resource set, the second control resource set, and/or the third control resource set.

The fourth control resource set may be further given based on at least the physical root index u included in the random access message 1 transmitted from the terminal apparatus 1 and/or a resource (PRACH resource) used for transmission of the random access message 1. Here, the random access message 1 may correspond to the monitoring of the fourth control resource set. The resource may indicate a resource of a time and/or a frequency. The resource may be given by an index of a resource block and/or an index of a slot (subframe). The monitoring of the fourth control resource set may be triggered by the random access message 1.

Step 5103 is a step in which the terminal apparatus 1 transmits, to the target cell, a request for RRC connection. The request for RRC connection is also referred to as a random access message 3. The random access message 3 may be transmitted via the PUSCH scheduled by the random access response grant. The random access message 3 may include an ID used to identify the terminal apparatus 1. The ID may be an ID managed in a higher layer. The ID may be an SAE Temporary Mobile Subscriber Identity (S-TMSI). The ID may be mapped to the CCCH in the logical channel.

Step 5104 is a step in which the base station apparatus 3 transmits Contention resolution message to the terminal apparatus 1. The contention resolution message is also referred to as the random access message 4. The terminal apparatus 1, after transmitting the random access message 3, monitors the PDCCH that performs scheduling of the PDSCH including the random access message 4. The random access message 4 may include a contention avoidance ID. Here, the contention avoidance ID is used to resolve a contention in which multiple terminal apparatuses 1 transmit signals by using a same radio resource. The contention avoidance ID is also referred to as UE contention resolution identity.

In step 5104, the terminal apparatus 1 which has transmitted the random access message 3 including the ID used for identifying the terminal apparatus 1 (S-TMSI, for example) monitors the random access message 4 including the Contention resolution message. In a case that the contention avoidance ID included in the random access message 4 is identical to the ID used to identify the terminal apparatus 1, the terminal apparatus 1 may consider that the contention resolution has been successfully completed, and set the value of the Temporary C-RNTI in the C-RNTI field. The terminal apparatus 1 having the value of the Temporary C-RNTI set in the C-RNTI field is considered to have completed an RRC connection.

The control resource set to monitor the PDCCH for scheduling of the random access message 4 may be the same as the fourth control resource set. The base station apparatus 3 can transmit the information on the reception of PDCCH included in the random access message 2 and indicate the monitoring of a fifth control resource set to the terminal apparatus 1. The terminal apparatus 1 monitors the PDCCH based on at least the information relating to reception of the PDCCH included in the random access message 2. The fifth control resource set may be used for scheduling of a random access message 5.

The terminal apparatus 1 in RRC connection can receive dedicated RRC signaling mapped to the DCCH in the logical channel. The base station apparatus 3 can transmit the dedicated RRC signaling including the information on the reception of the PDCCH and indicate the monitoring of a sixth control resource set to the terminal apparatus 1. The terminal apparatus 1 may monitor the PDCCH based on at least the information on the reception of the PDCCH included in the dedicated RRC signaling. The second configuration or the third configuration may be applied to a sixth control resource set. A physical resource of the sixth control resource set may be given based on at least the C-RNTI.

The base station apparatus 3 can transmit the random access message 4 including the information on the reception of the PDCCH reception, and indicate the monitoring of the sixth control resource set to the terminal apparatus 1. In a case that the random access message 4 includes the information on the reception of the PDCCH, the terminal apparatus 1 may monitor the sixth control resource set based on at least the information on the reception of the PDCCH. In a case that the random access message 4 does not include the information on the reception of the PDCCH, the terminal apparatus 1 may monitor the USS included in at least any of the first to the fifth control resource sets. The physical resource for the USS may be given based on at least the C-RNTI. The first to the fifth control resource sets may be common control resource sets. The sixth control resource set may be a dedicated control resource set.

The information on the reception of the PDCCH may include information common to multiple control resource sets and information configured for each of the multiple control resource sets. For example, the information on the REG group applied to the first to the fourth control resource sets may be defined. Here, the information on the reception of the PDCCH associated with the first control resource set may include the information on the REG group, and the information on the reception of the PDCCH associated with the second to fourth control resource sets need not include the information on the REG group. The information on the reception of the PDCCH associated with the first control resource set may be applied to the second to fourth control resource sets. Here, the information on the REG group may be defined individually for each of the fifth and sixth control resource sets. Here, the information for indicating the control resource set may be defined individually for the first to sixth control resource sets.

FIG. 14 is a diagram illustrating an example of the PDCCH candidate monitored by the terminal apparatus 1 according to the one aspect of the present embodiment. FIG. 14(a) illustrates an example in which the number of PDCCH candidates are individually configured based on the start symbol of the PDCCH and/or control resource set. a1 to a6 are PDCCH candidate scaling factors, and therefore, the numbers of PDCCH candidates serving as references are multiplied by a1 to a6, but a1 to a6 may be added to or subtracted from the numbers of PDCCH candidates serving as references. FIG. 14(b) illustrates an example in which the number of PDCCH candidates are individually configured based on the mini-slot in which the PDCCH and/or control resource set are included. Note that an example in which four mini-slots are configured for one slot is illustrated. b1 to b6 are PDCCH candidate scaling factors, and therefore, the numbers of PDCCH candidates serving as references are multiplied by b1 to b6, but b1 to b6 may be added to or subtracted from the numbers of PDCCH candidates serving as references. Specifically, the number of blind detections based on the number of PDCCH candidates may be defined by the PDCCH starting symbol and the number of the mini-slot in which the PDCCH is included. Each of the a1 to a6, b1 to b6 may be configured separately.

Figure 15:
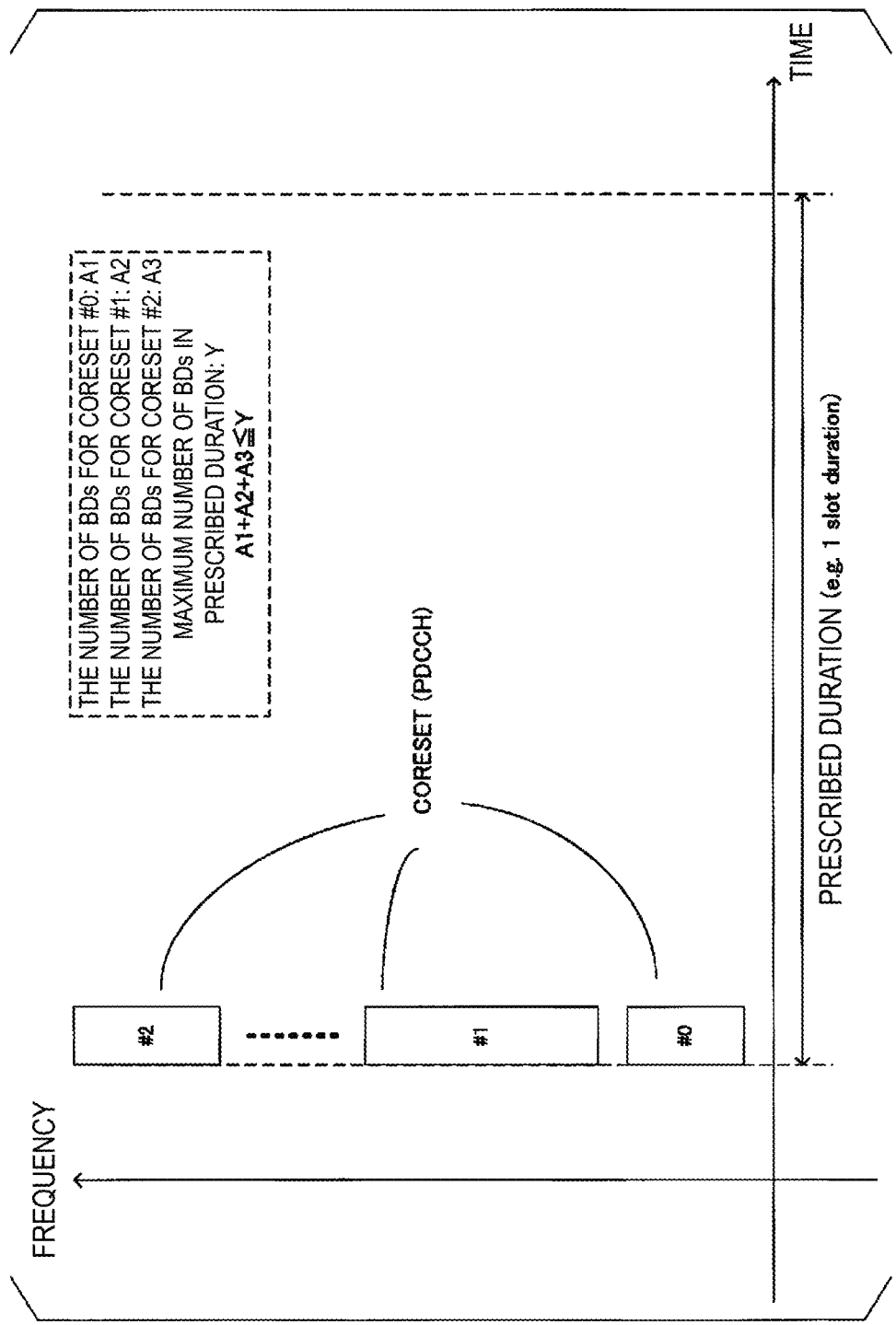
FIG. 15 is a diagram illustrating an example of allocation of a slot (first slot format)-based control resource set according to the one aspect of the present embodiment.

FIG. 15 is a diagram illustrating an example of allocation of a slot (first slot format)-based control resource set according to the one aspect of the present embodiment. Based on the capability information from the terminal apparatus 1, the base station apparatus 3 may configure the number of PDCCH candidates, aggregation level, and DCI format skip and the like of each control resource set so that a sum of the numbers A1 to A3 of blind detections in the control resource sets #0 to #2, respectively, does not exceed the maximum number Y of blind detections in a prescribed duration.

Figure 16:
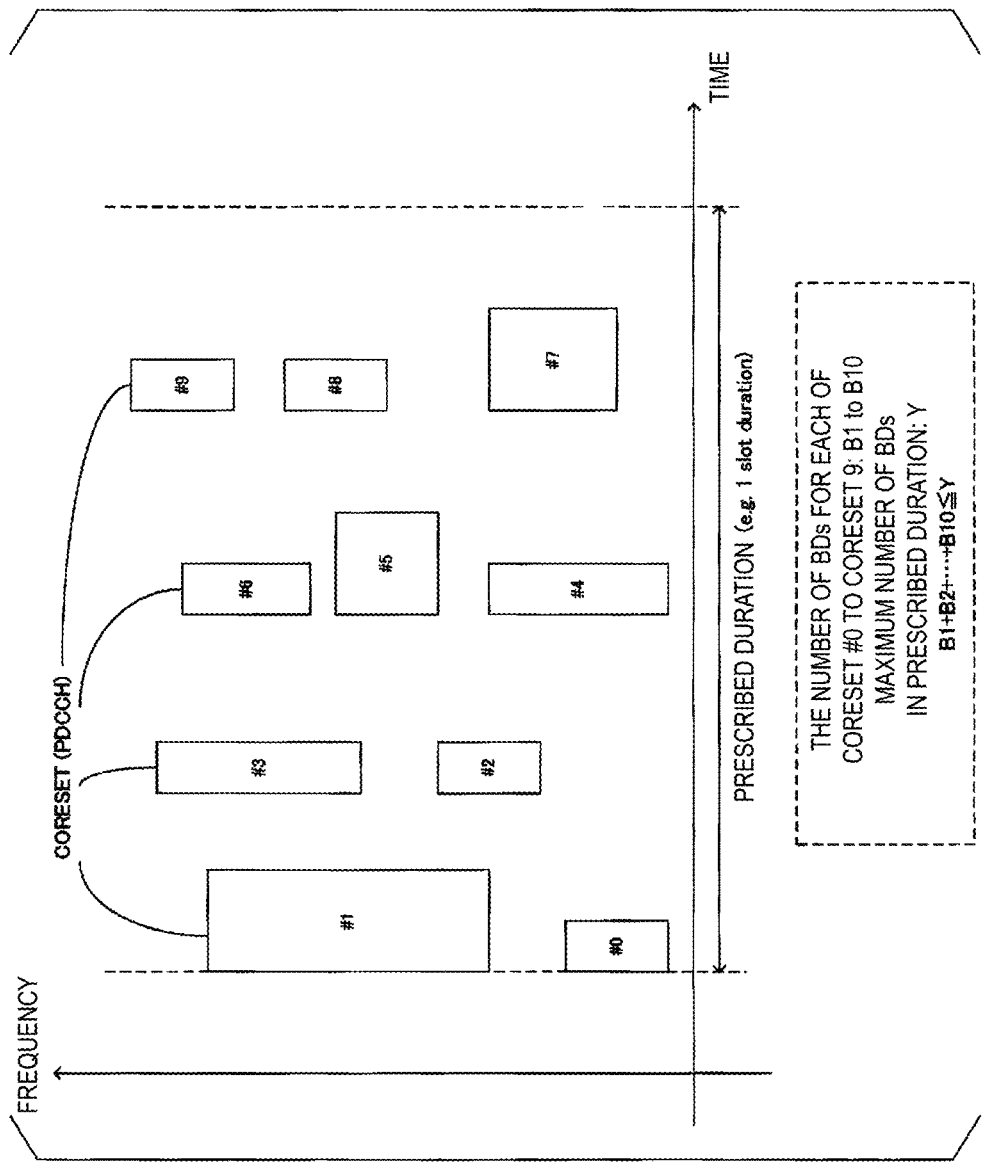
FIG. 16 is a diagram illustrating an example of allocation of a non-slot (second slot format)-based control resource set according to one aspect of the present embodiment.

FIG. 16 is a diagram illustrating an example of allocation of a non-slot (second slot format)-based control resource set according to one aspect of the present embodiment. In this example, more than one control resource set is located in the time domain. Based on the capability information from the terminal apparatus 1, the base station apparatus 3 may configure the number of PDCCH candidates, aggregation level, and DCI format skip and the like of each control resource set so that a sum of the numbers B1 to B10 of blind detections in the control resource sets #0 to #9, respectively, does not exceed the maximum number Y of blind detections in a prescribed duration.

Various aspects of devices according to one aspect of the present embodiment will be described below.

(1) To accomplish the object described above, aspects of the present invention are contrived to provide the following measures. That is, a first aspect of the present invention is a terminal apparatus including: a receiver configured to monitor a PDCCH in a control resource set; and a decoding unit configured to decode the PDCCH. The PDCCH includes one or more REG groups. One of the one or more REG groups includes multiple REGs. The multiple REGs in the one REG group are multiplied by the same precoder and transmitted. In a first control resource set, the number of the REGs constituting the one REG group is given based on at least a PBCH. Whether a first configuration is applied to the first control resource set is given based on information on a reception of the PDCCH. The first configuration indicates that the number of the REGs constituting the one REG group is given based on at least the number of PRBs included in the first control resource set. In a second control resource set, the number of the REGs constituting the one REG group is given based on at least dedicated RRC signaling.

(2) In the first aspect of the present invention, whether the PDCCH included in the second control resource set is mapped to a reference signal corresponding to the first control resource set is given based on at least whether the first configuration is applied to the one REG group.

(3) Additionally, a second aspect of the present invention is a base station apparatus including: a coding unit configured to encode a PDCCH; and a transmitter configured to transmit the PDCCH in a control resource set. The PDCCH includes one or more REG groups. One of the one or more REG groups includes multiple REGs. The multiple REGs in the one REG group are multiplied by the same precoder and transmitted. In a first control resource set, the number of the REGs constituting the one REG group is given based on at least a PBCH. Whether a first configuration is applied to the first control resource set is given based on information on a reception of the PDCCH. The first configuration indicates that the number of the REGs constituting the one REG group is given based on at least the number of PRBs included in the first control resource set. In a second control resource set, the number of the REGs constituting the one REG group is given based on at least dedicated RRC signaling.

(4) In the second aspect of the present invention, whether the PDCCH included in the second control resource set is mapped to a reference signal corresponding to the first control resource set is given based on at least whether the first configuration is applied to the one REG group.

(5) A third aspect of the present invention is a terminal apparatus including: a transmitter configured to transmit capability information of the terminal apparatus; and a receiver configured to perform blind detection of a PDCCH from a search space in a control resource set. In a case that a capability of blind detection is supported, the blind detection detecting the PDCCH from search spaces in control resource sets the number of which is greater than a prescribed number in a prescribed duration, the transmitter combines and transmits, as the capability information of the terminal apparatus, at least two of pieces of information including (a) a maximum number of blind detections that can be performed in the prescribed duration, (b) a maximum number of blind detections that can be performed per one OFDM symbol, (c) a maximum number of blind detections in a unit time, (d) a maximum number of blind detections based on configuration for the control resource set, (e) a maximum number of the control resource sets for which blind detections can be performed in a prescribed duration, and (f) a maximum number of the control resource sets for which blind detections can be simultaneously performed.

(6) In the third aspect of the present invention, in the above terminal apparatus, in a case that only a first slot format is supported, only the aforementioned information (a) is transmitted as the capability information of the terminal apparatus, and in a case that a second slot format is supported, at least two of the aforementioned pieces of information (a) to (d) are combined and transmitted as the capability information of the terminal apparatus.

Note that in the above terminal apparatus, in the case that only the first slot format is supported, at least the aforementioned information (a) may be transmitted as the capability information of the terminal apparatus, and in the case that the second slot format is supported, at least two of the aforementioned pieces of information (a), (c), (d), and (f) may be combined and transmitted as the capability information of the terminal apparatus.

(7) In the third aspect of the present invention, in the above terminal apparatus, in a case that the receiver receives, in a first slot, a DCI format including a slot format for a second slot after the first slot, for the slot format indicating a first format, the blind detection of the PDCCH is performed on the PDCCH received in the second slot such that the maximum number corresponding to the aforementioned information (a) is not exceeded, and for the slot format indicating a second format, the blind detection of the PDCCH is performed on the PDCCH received in the second slot based on the aforementioned pieces of information (a), (b), and (d).

Note that in a case that the slot format indicates the second format, the terminal apparatus may perform the blind detection of the PDCCH on the PDCCH received in the second slot based on at least two of the aforementioned pieces of information (a), (c), (d), and (f).

(8) A fourth aspect of the present invention is a terminal apparatus including: a transmitter configured to transmit capability information of the terminal apparatus; and a receiver configured to perform blind detection of a PDCCH from a search space in a control resource set. The transmitter transmits, as the capability information of the terminal apparatus, a maximum number of blind detections that can be performed in a first duration and a maximum number of blind detections that can be performed in a second duration.

(9) A fifth aspect of the present invention is a terminal apparatus including: a transmitter configured to transmit capability information of the terminal apparatus; and a receiver configured to perform blind detection of a PDCCH from a search space in a control resource set. The transmitter transmits, as the capability information of the terminal apparatus, a maximum number of blind detections that can be performed in a first duration and a maximum number of blind detections that can be performed in a second duration within the first duration.

(10) In the fifth aspect of the present invention, in the terminal apparatus, in a case that the first duration includes a plurality of the second durations, a maximum number of blind detections is configured for each of at least a first one of the plurality of the second durations and a last one of the plurality of the second durations.

(11) A sixth aspect of the present invention is a method including the steps of: transmitting capability information of a terminal apparatus; performing blind detection of a PDCCH from a search space in a control resource set; and in a case that a capability of blind detection is supported, the blind detection detecting the PDCCH from search spaces in control resource sets the number of which is greater than a prescribed number in a prescribed duration, combining and transmitting, as the capability information of the terminal apparatus, at least two of pieces of information including (a) a maximum number of blind detections that can be performed in the prescribed duration, (b) a maximum number of blind detections that can be performed per one OFDM symbol, (c) a maximum number of blind detections in a unit time, (d) a maximum number of blind detections based on configuration for the control resource set, (e) a maximum number of the control resource sets for which blind detection can be performed in a prescribed duration, and (f) a maximum number of the control resource sets for which blind detections can be simultaneously performed.

(12) A seventh aspect of the present invention is a method including the steps of: transmitting capability information of a terminal apparatus; performing blind detection of a PDCCH from a search space in a control resource set; and transmitting, as the capability information of the terminal apparatus, a maximum number of blind detections that can be performed in a first duration and a maximum number of blind detections that can be performed in a second duration.

(13) An eighth aspect of the present invention is a method including the steps of: transmitting capability information of a terminal apparatus; performing blind detection of a PDCCH from a search space in a control resource set, and transmitting, as the capability information of the terminal apparatus, a maximum number of blind detections that can be performed in a first duration and a maximum number of blind detections that can be performed in a second duration within the first duration.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit

The invention claimed is:

1. A terminal apparatus comprising:
a transmitter configured to transmit capability information of the terminal apparatus; and
a receiver configured to monitor a number of PDCCH candidates in at least one search space of at least one control resource set in a prescribed duration, wherein:
the capability information includes a maximum number of blind detections in the prescribed duration and a maximum number of Orthogonal Frequency Division Multiplex (OFDM) symbols for a time resource configurable for the at least one control resource set in the prescribed duration,
the number of PDCCH candidates does not exceed the maximum number of blind detections in the prescribed duration, and
the prescribed duration is a length of a mini-slot.

2. A method comprising the steps of:
transmitting capability information of a terminal apparatus; and
monitoring a number of PDCCH candidates in at least one search space of at least one control resource set in a prescribed duration, wherein:
the capability information includes a maximum number of blind detections in the prescribed duration and a maximum number of Orthogonal Frequency Division Multiplex (OFDM) symbols for a time resource configurable for the at least one control resource set in the prescribed duration,
the number of PDCCH candidates does not exceed the maximum number of blind detections in the prescribed duration, and
the prescribed duration is a length of a mini-slot.

* * * * *